United States Patent
Tatsuta et al.

(10) Patent No.: US 10,310,595 B2
(45) Date of Patent: Jun. 4, 2019

(54) INFORMATION PROCESSING APPARATUS, INFORMATION PROCESSING METHOD, COMPUTER PROGRAM, AND IMAGE PROCESSING SYSTEM

(71) Applicant: Sony Corporation, Tokyo (JP)

(72) Inventors: Hirokazu Tatsuta, Kanagawa (JP); Kenta Kawamoto, Tokyo (JP); Yuichiro Koyama, Tokyo (JP); Takayasu Kon, Tokyo (JP); Yuichi Hasegawa, Tokyo (JP); Masaru Shimura, Kanagawa (JP); Yuki Yamamoto, Chiba (JP); Eiichi Tanaka, Chiba (JP)

(73) Assignee: Sony Corporation (JP)

( * ) Notice: Subject to any disclaimer, the term of this patent is extended or adjusted under 35 U.S.C. 154(b) by 36 days.

(21) Appl. No.: 15/311,341

(22) PCT Filed: Apr. 21, 2015

(86) PCT No.: PCT/JP2015/062055
§ 371 (c)(1),
(2) Date: Nov. 15, 2016

(87) PCT Pub. No.: WO2016/002318
PCT Pub. Date: Jan. 7, 2016

(65) Prior Publication Data
US 2017/0083084 A1 Mar. 23, 2017

(30) Foreign Application Priority Data
Jun. 30, 2014 (JP) .................................. 2014-135216
Aug. 27, 2014 (JP) .................................. 2014-172231

(51) Int. Cl.
*G06F 3/01* (2006.01)
*G06F 3/048* (2013.01)
(Continued)

(52) U.S. Cl.
CPC ............ *G06F 3/011* (2013.01); *G02B 27/017* (2013.01); *G06F 3/012* (2013.01); *G06F 3/048* (2013.01);
(Continued)

(58) Field of Classification Search
None
See application file for complete search history.

(56) References Cited

U.S. PATENT DOCUMENTS 6,118,888 A * 9/2000 Chino ..................... G06F 3/011
382/118
2014/0198962 A1* 7/2014 Anabuki ............... G06T 7/0014
382/128

FOREIGN PATENT DOCUMENTS

JP 09-106322 A 4/1997
JP 2001208529 A * 8/2001
(Continued)

OTHER PUBLICATIONS

International Search Report corresponding to PCT/JP2015/062055, dated Jul. 14, 2015 (3 pgs.).

*Primary Examiner* — Kenneth B Lee, Jr.
(74) *Attorney, Agent, or Firm* — Lerner, David, Littenberg, Krumholz & Mentlik, LLP

(57) ABSTRACT

Provided is an image display device configured to display a free viewpoint image that tracks a movement of observer's head and trunk.
The line-of-sight direction and trunk orientation of the user are individually oriented in a free viewpoint space displayed on a display device 500 based on posture information of the user's head and trunk, which are respectively obtained from a head motion tracking device 200 and a trunk motion tracking device 300. A behavior that is natural in real space can be represented by moving a line of sight to a front direction of the trunk on a space in a state where the line of
(Continued)

sight does not match the front direction of the trunk. An unnatural UI that goes straight to the line-of-sight direction is prevented regardless of orientation of the trunk.

18 Claims, 32 Drawing Sheets

(51) Int. Cl.
*G06T 15/20* (2011.01)
*H04N 7/18* (2006.01)
*G06K 9/00* (2006.01)
*H04N 13/04* (2006.01)
*G02B 27/01* (2006.01)
*G06T 7/70* (2017.01)

(52) U.S. Cl.
CPC .............. *G06K 9/00* (2013.01); *G06T 7/70* (2017.01); *G06T 15/20* (2013.01); *H04N 7/185* (2013.01); *H04N 13/0429* (2013.01); *G02B 2027/014* (2013.01); *G02B 2027/0178* (2013.01); *G02B 2027/0187* (2013.01); *G09G 2320/068* (2013.01); *G09G 2320/0693* (2013.01)

(56) References Cited

FOREIGN PATENT DOCUMENTS

| | | |
|---|---|---|
| JP | 2002269593 A | 9/2002 |
| JP | 2010256534 A | 11/2010 |
| JP | 2012141461 A | 7/2012 |
| JP | 2013083731 A | 5/2013 |
| WO | 2015098292 A1 | 7/2015 |

* cited by examiner

INFORMATION PROCESSING APPARATUS, INFORMATION PROCESSING METHOD, COMPUTER PROGRAM, AND IMAGE PROCESSING SYSTEM

CROSS-REFERENCE TO RELATED APPLICATIONS

This application is a national phase entry under 35 U.S.C. § 371 of International Application No. PCT/JP2015/062055 filed Apr. 21, 2015, which claims the priority from Japanese Patent Application No. 2014-135216, filed in the Japanese Patent Office on Jun. 30, 2014, and Japanese Patent Application No. 2014-172231, filed in the Japanese Patent Office on Aug. 27, 2014.

TECHNICAL FIELD

The technology described in the present specification relates to an information processing apparatus, information processing method, computer program, and image processing system for processing an image that tracks the movement of an observer.

BACKGROUND ART

An image display device, i.e., head-mounted display, worn on the user's head or face has been known. The head-mounted display is provided with an image display unit on both the right and left eyes and is configured to be capable of controlling visual and auditory perception using together with a headphone. The configuration for blocking the outside world entirely when it is worn on the head increases the virtual reality during viewing. The head-mounted display is capable of projecting a different video image onto each eye and is capable of presenting a 3D image by displaying an image having parallax on the left and right eyes.

This type of head-mounted display forms a virtual image on the retina of the eye to allow the user to observe it. In this regard, the virtual image is formed on the side of an object that is situated closer to the lens than the focal length. As one example, there has been developed a head-mounted display that forms an enlarged virtual image of a display image on the user's pupil by placing a virtual image optical system of a wide viewing angle to be spaced by 25 millimeters away from the front of the pupil and by placing a display panel having a size of the effective pixel range of about 0.7 inches further in front of the wide viewing angle optical system (e.g. see Patent Literature 1).

The user is able to observe an image obtained by segmenting a part of the wide-angle image using this type of head-mounted display. As one example, there has been developed a head-mounted display that allows reality experience of a video image of 360 degrees rotation view to be achieved by installing a head motion tracking device including a gyro sensor or the like on the head and by causing it to track the movement of the user's head (see Patent Literatures 2 and 3). It is possible to implement the free viewpoint viewing and viewpoint moving environment by moving a display area in the wide-angle image to cancel the head's movement detected by the gyro sensor.

SUMMARY OF INVENTION

Technical Problem

The object of the technology described in the present specification is to provide an improved information processing apparatus, information processing method, computer program, and image processing system, capable of suitably processing an image that tracks the movement of an observer.

Solution to Problem

The present application has been made in view of the aforementioned problems, and a technology of the present disclosure may include an information processing apparatus including: a receiver configured to receive first information on a posture of a head of an observer and second information on a posture of a body other than the head of the observer; and an image rendering processing unit configured to generate a display image corresponding to a posture of the observer based on the first information and the second information.

According to a technology of the present disclosure, the receiver of the information processing apparatus according to the present disclosure receives at least a posture of a trunk of the observer as the second information, and the image rendering processing unit generates a free viewpoint image that tracks a posture of the head of the observer by orienting a line-of-sight direction of the observer in a free viewpoint space based on the first information and by orienting an orientation (viewpoint position) of the body of the observer in the free viewpoint space based on a posture of the trunk of the observer obtained from the second information.

According to a technology of the present disclosure, the image rendering processing unit of the information processing apparatus according to the present disclosure, when receiving a control signal used to instruct the observer to move in the free viewpoint space as an input, determines a point after movement (viewpoint position) by recognizing, as a front direction, an orientation of a body oriented based on a posture of the trunk of the observer obtained from the second information.

According to a technology of the present disclosure, the image rendering processing unit of the information processing apparatus according to the present disclosure generates a free viewpoint image that tracks a posture of the head of the observer by orienting a line-of-sight direction of the observer in a free viewpoint space based on the first information and by arranging in a fixed position oriented based on the posture obtained from the second information.

According to a technology of the present disclosure, the receiver of the information processing apparatus according to the present disclosure receives at least a posture of the trunk of the observer as the second information, and the image rendering processing unit generates a free viewpoint image that tracks a posture of the head of the observer by orienting a line-of-sight direction of the observer in a free viewpoint space based on the first information, by orienting an orientation (viewpoint position) of the body of the observer in the free viewpoint space based on a posture of the trunk of the observer obtained from the second information, and by arranging a predetermined image widget in a fixed position oriented based on a posture of the trunk of the observer.

According to a technology of the present disclosure, the information processing apparatus according to the present disclosure, further includes a calibration processing unit configured to acquire a calibration parameter. The image rendering processing unit performs image generation using posture information corrected by the calibration parameter.

According to a technology of the present disclosure, the calibration processing unit of the information processing apparatus according to the present disclosure, based on head posture information obtained from the first information and second posture information obtained from the second information, calculates a calibration parameter used to correct the second posture information and corrects the second posture information using the calibration parameter.

According to a technology of the present disclosure8, the calibration processing unit of the information processing apparatus according to the present disclosure calculates a posture conversion parameter used to match the second posture information with the head posture information as the calibration parameter, by using the head posture information and the second posture information.

According to a technology of the present disclosure, the posture information is represented by a quaternion. The calibration processing unit of the information processing apparatus according to of the present disclosure calculates a calibration quaternion used to correct the second posture information by multiplying the head posture information by an inverse of a quaternion of the second posture information from a right side, and the correction is performed by multiplying the quaternion of the second posture information by the calibration quaternion from a left side.

According to a technology of the present disclosure, the calibration processing unit of the information processing apparatus according to the present disclosures estimates a calibration parameter used to correct the second posture information based on rotational displacement for a certain period of a coordinate system of a head posture obtained from the first information and a coordinate system of a posture obtained from the second information and a property of a human body.

According to a technology of the present disclosure, the calibration processing unit of the information processing apparatus according to the present disclosure sets a time-series average of calibration parameters calculated for a certain period based on head posture information obtained from the first information and second posture information obtained from the second information to be a final calibration parameter.

According to a technology of the present disclosure, the posture information is represented by a quaternion. The calibration processing unit of the information processing apparatus according to of the present disclosure updates a calibration quaternion by performing spherical linear interpolation between a calibration quaternion newly calculated based on a quaternion of posture information obtained from each of the first information and the second information that have been newly received and a last calibration quaternion determined by the time-series average.

According to a technology of the present disclosure, a posture of the trunk of the observer is calculated based on the second information, and the calibration processing unit of the information processing apparatus according to the present disclosure determines an average value of an angular difference of a rotation direction, when a gravity direction is set to a rotation axis, of posture information of a head and a trunk obtained respectively from the first information and the second information that have been newly received, and calculates a calibration parameter on a gravity direction and the average value.

According to a technology of the present disclsure, the image rendering processing unit of the information processing apparatus according to the present disclosure processes a display image on the display unit based on a difference between a head posture obtained from the first information and a trunk posture obtained from the second information.

According to a technology of the present disclosure, in the information processing apparatus according to the present disclosoure, the image rendering processing unit generates a free viewpoint image by correcting a world coordinate system in a manner that a difference between a head posture and a trunk posture in the free viewpoint space decreases under a biosafety support mode.

According to a technology of the present disclosure, the image rendering processing unit of the information processing apparatus according to the present disclosure generates a free viewpoint image by fixing a head posture in a free viewpoint space at a point of time when a biosafety support mode is set and by changing a trunk posture in a free viewpoint space depending on a head posture detected by the head posture detection unit under the biosafety support mode.

According to a technology of the present disclsoure, in the information processing apparatus according to the present disclosure, the biosafety support mode is set when a state where a difference between a head posture obtained from the first information and a trunk posture obtained from the second information exceeds a first threshold continues for a certain time, and the biosafety support mode is released when the difference is equal to or less than a second threshold that is less than the first threshold.

A technology of the present disclosure is an information processing method including: a receiving step of receiving first information on a posture of a head of an observer and second information on a posture of a body other than the head of the observer; and; and an image rendering processing step of generating a display image corresponding to a posture of the observer based on the first information and the second information.

A technology of the present disclosure is a computer program written in a computer readable format to cause a computer to function as: a head posture operation unit configured to calculate posture information of a head of an observer based on a result obtained by detection in a head posture detection unit configured to detect a posture of the head of the observer; a second posture operation unit configured to calculate posture information of a second part of a body other than the head of the observer based on a result obtained by detection in a second posture detection unit configured to detect a posture of one or more of the second part; and an image rendering processing unit configured to process an image to be displayed on a display unit based on a posture of the head of the observer and a posture of the second part, the display unit being fixed to the head or a face of the observer.

The computer program according to the present disclosure defines a computer program described in a computer readable format to implement a predetermined process on a computer. In other words, by installing the computer program according to the present disclosure in the computer, cooperative action is exerted on the computer, so that it is possible to provide the same operational effects as those of the information processing apparatus according to the present disclosure.

A technology of the present disclosure is an image processing system including: a display unit fixed to a head or a face of an observer; a head posture detection unit configured to detect a posture of the head of the observer; a second posture detection unit configured to detect a posture of one or more second parts of a body other than the head of the observer; and an image rendering processing unit configured to process a display image on the display unit based on a posture of the head of the observer and a posture of each of the second parts.

Advantageous Effects of Invention

According to the technology described in the present specification is to provide an improved information processing apparatus, information processing method, computer program, and image processing system, capable of suitably processing an image that tracks the movement of an observer.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

DESCRIPTION OF EMBODIMENT(S)

An embodiment of the technology disclosed in this specification will be described in detail below with reference to the drawings.

A. System Configuration

Figure 1:
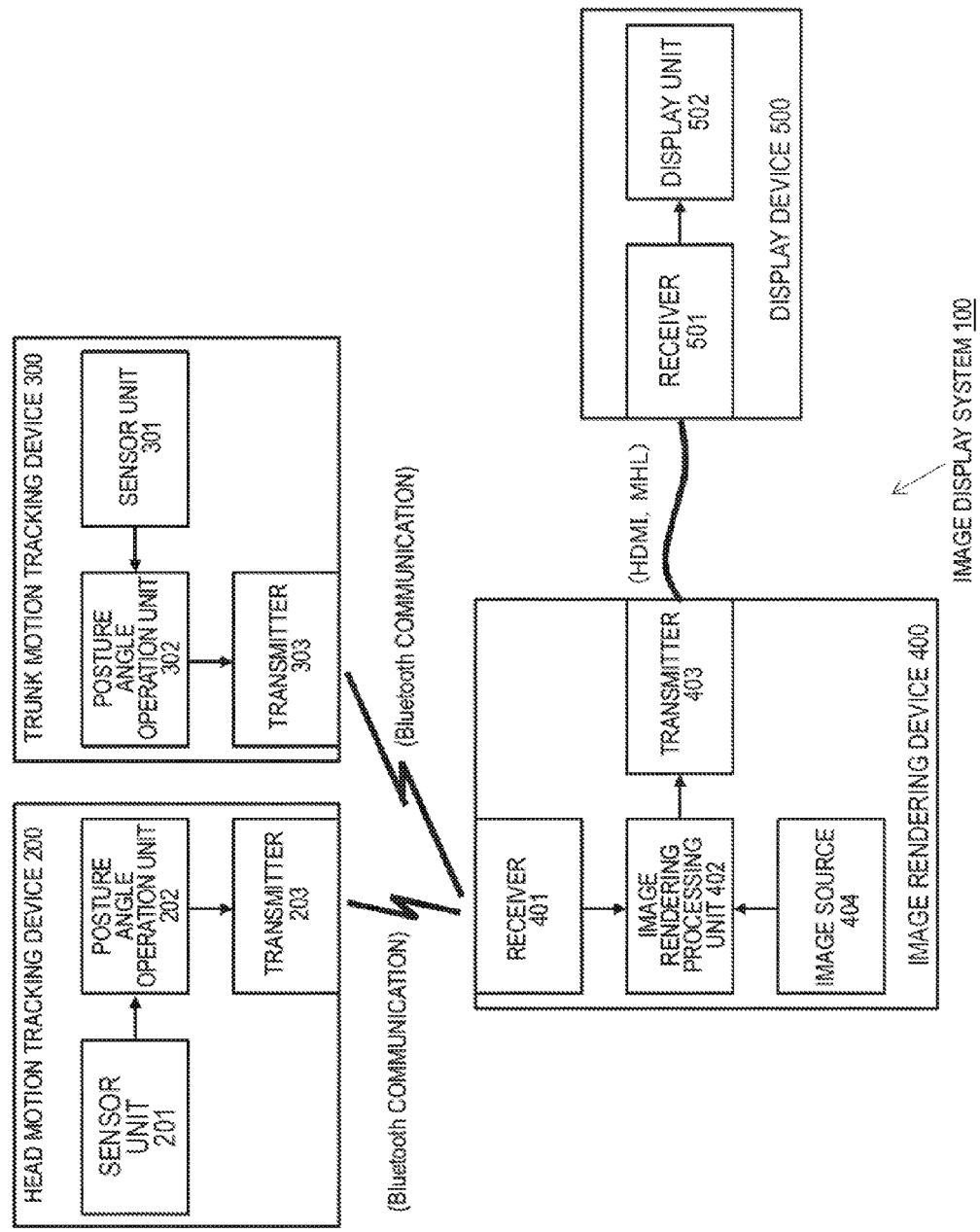
FIG. 1 is a diagram schematically illustrating an exemplary configuration of an image display system 100 to which the technology disclosed herein is applied.

FIG. 1 illustrates schematically an exemplary configuration of an image display system 100 to which the technology disclosed herein is applied. The image display system 100 illustrated is configured to include a head motion tracking device 200, a trunk motion tracking device 300, an image rendering device 400, and a display device 500.

The head motion tracking device 200 is used while it is worn on the head of a user who observes an image displayed on the display device 500, and outputs posture information of the user's head to the image rendering device 400 at predetermined transmission intervals. The trunk motion tracking device 300 is used while it is worn on the trunk of the user and outputs posture information of the trunk of the user to the image rendering device 400 at predetermined transmission intervals.

In the illustrated example, the head motion tracking device 200 is configured to include a sensor unit 201, a posture angle operation unit 202, and a transmitter 203 used to transmit the obtained posture information to the image rendering device 400. The trunk motion tracking device 300 is configured to include a sensor unit 301, a posture angle operation unit 302, and a transmitter 303 used to transmit the obtained posture information to the image rendering device 400. The head motion tracking device 200 and the trunk motion tracking device 300 may be different only in terms of a part where it is attached to the user's body or a method of attaching from each other, but may be similar in terms of internal configuration and operation characteristics to each other. The description below will be made only of the internal configuration of the head motion tracking device 200, but the internal configuration of the trunk motion tracking device 300 is similarly applied.

The sensor unit 201 is configured by a combination of a plurality of sensor devices such as gyro sensor, acceleration sensor, and geomagnetic sensor, as one example. In this description, it is a sensor that can detect a total of nine axes including three-axis gyro sensor, three-axis acceleration sensor, and three-axis geomagnetic sensor. The posture angle operation unit 202 performs an operation on posture information of a part such as the user's head where it is attached, based on a result obtained by detecting nine axes in the sensor unit 201. The transmitter 203 transmits the obtained posture information to the image rendering device 400. However, when the trunk motion tracking device 300 is only necessary to detect the orientation of the user's trunk, the sensor unit 301 may be configured to have a simple structure provided with only a gyro sensor without being necessary to be the nine-axis detection sensor.

Figure 21:
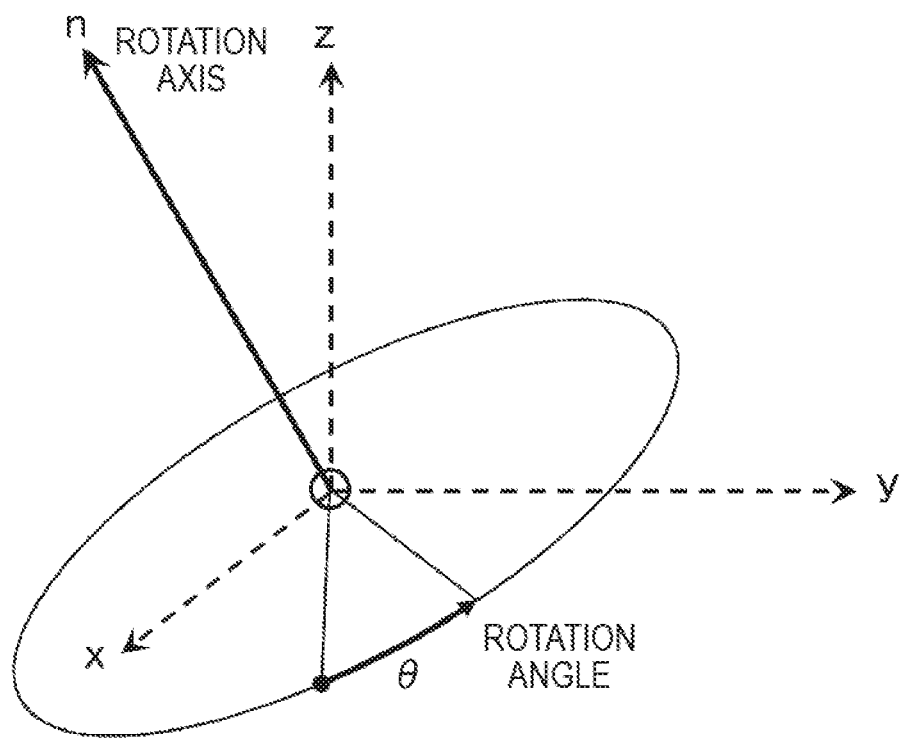
FIG. 21 is a diagram illustrating a quaternion q.

In the present embodiment, the posture information of the head or the trunk is processed by representing it in the form of quaternion. The quaternion is suitable for the calculation using a computer since there is no singular point. In the field of computer graphics, the posture of an object is represented generally using the quaternion. A quaternion q is the quaternion that includes rotation axis (vector) and rotation angle (scalar), as shown in the following formula (1) and FIG. 21.

[Math. 1]

$$q = s + ix + jy + kz \qquad (1)$$
$$= (s, x, y, z)$$
$$= (\cos(\theta/2), n\sin(\theta/2))$$

Figure 2:
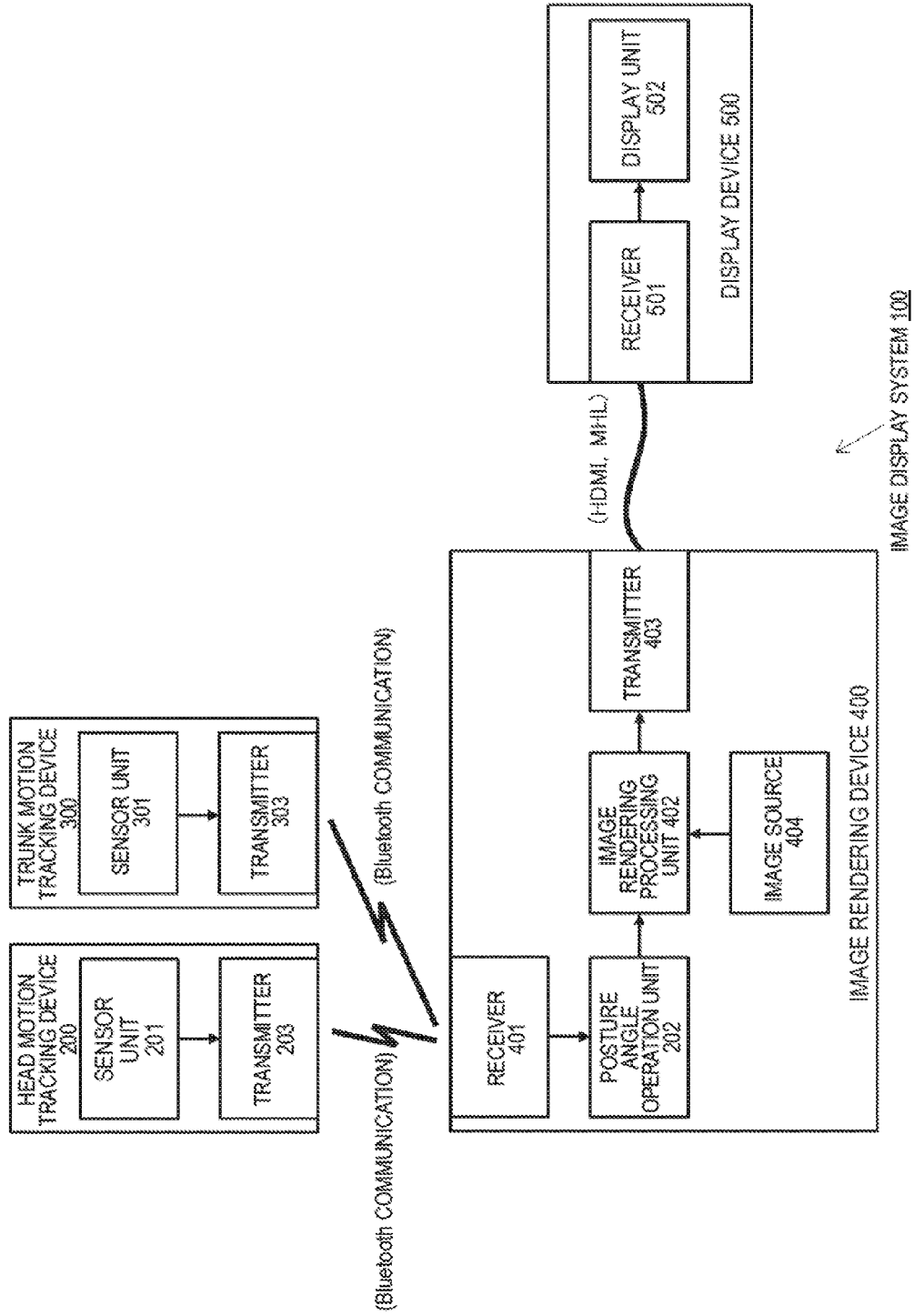
FIG. 2 is a diagram illustrating a modification of the image display system 100.

However, in the head motion tracking device 200 or the trunk motion tracking device 300, it is not essential to perform an operation on the posture information represented by the quaternion from the information on the posture angle detected by the sensors 201 and 301. The head motion tracking device 200 or the trunk motion tracking device 300 may transmit information in which the posture angle is represented in a form other than the quaternion to the image rendering device 400 for allowing the quaternion to be calculated on the side of the image rendering device 400. As illustrated in FIG. 2, the head motion tracking device 200 or the trunk motion tracking device 300 may output sensor information of the sensor unit 201 and the sensor unit 301 without any modification for allowing the posture angle operation unit 202 disposed in the image rendering device 400 to calculate the posture angle from the sensor information in the form of quaternion or other forms.

In the image display system 100 illustrated, the connections between the head motion tracking device 200 and the image rendering device 400 and between the trunk motion tracking device 300 and the image rendering device 400 are established by wireless communication such as Bluetooth (registered trademark) communication. The connections between the head motion tracking device 200 and the image rendering device 400 and between the trunk motion tracking device 300 and the image rendering device 400 may be surely established via high-speed wired inface such as universal serial bus (USB) instead of wireless communication.

The image rendering device 400 performs a rendering process on an image displayed on the display device 500. The image rendering device 400 may be configured as an Android (registered trademark)-equipped terminal such as a smartphone and tablet, a personal computer, or a game console, as one example, but it is not limited to these devices.

In the illustrated example, the image rendering device 400 is configured to include a receiver 401 used to receive the posture information from the head motion tracking device 200 and the trunk motion tracking device 300, an image rendering processing unit 402 used to perform the rendering process of an image based on the posture information, a transmitter 402 used to transmit the rendered image to the display device 500, and an image source 404 serving as a source of image data. Although not illustrated, the image rendering device 400 may be configured to include an audio output unit.

The receiver 401 receives the posture information from the head motion tracking device 200 and the trunk motion tracking device 300 via Bluetooth (registered trademark) communication or the like. As described above, the posture information from the head motion tracking device 200 is represented in the quaternion form.

The image source 404 includes a storage device, such as hard disc drive (HDD) and solid state drive (SSD), used to record image content, a media playback device used to play back a recording media such as Blu-ray (registered trademark), a broadcasting tuner used to select a channel to receive a game image generated by a game console or a digital broadcast signal, a communication interface used to receive image content streamed from a server on the Internet, and a wireless interface used to receive wirelessly an image captured by an external camera provided on a mobile device such as radio control car and automobile, as one example.

The image rendering processing unit 402 renders an image displayed on the side of the display device 500 from image data of the image source 404. The image rendering processing unit 402 renders a free viewpoint image by segmenting a displaying viewing angle corresponding to the posture information of the user's head and trunk, which is received by the receiver 401, from an original image of omnidirectional type or an original image with a wide viewing angle such as 4K supplied from the image source 404, as one example. An exemplary system configuration in which a server on the Internet renders the free viewpoint image is envisaged. In this case, as one example, it is preferable that each of the head motion tracking device 200 or the trunk motion tracking device 300 transmits the posture information to a server serving as the image rendering device 400, and the display device 500 receives and displays the image segmented by the server.

The connection between the image rendering device 400 and the display device is established via a wired cable such as high-definition multimedia interface (HDMI, registered trademark) and mobile high-definition link (MHL), as one example. Alternatively, this connection may be established by wireless communication such as wirelessHD and Miracast. The transmitter 403 transmits uncompressed image data (or, compressed image data is also available) that is rendered by the image rendering processing unit 402 to the display device 500 using any of the communication paths.

The display device 500 is configured to include a receiver 501 used to receive image data from the image rendering device 400 and a display unit 502 used to display the received image. The display device 500 (or the display unit 502) is configured, as one example, as a head-mounted display that is fixed to the head or face part of the user who observes an image (e.g. see Patent Literature 1).

The receiver 501 receives image data from the image rendering device 400 via a communication path such as HDMI (registered trademark) and MHL, as one example. When there is compressed image data, the receiver performs a decoding and decompression process. The display unit 502 displays the received image data on a screen.

When the display device 500 is configured as a head-mounted display, the display unit 502 is provided with, as one example, the left and right screens that are fixedly installed in the left and right eyes of the user, respectively, and displays the left-eye image and the right-eye image. The screen of the display unit 502 is composed of, as one example, a display panel including a micro-display such as an organic electro-luminescence device (OLED) and liquid crystal display (LCD), or a laser scanning display such as retina direct display. The display unit 502 is provided with a virtual image optical system that enlarges a display screen, projects it, and focuses an enlarged virtual image having a predetermined image viewing angle on the user's pupil.

On the side of the image rendering device 400, an image obtained by segmenting a displaying viewing angle corresponding to the posture information of the user's head and trunk is rendered from an original image of omnidirectional type or an original image with a wide viewing angle such as 4K, as one example. On the side of the display device 500, a displayed area in the original image is moved to cancel a change in the posture of the user's head. Thus, it is possible to reproduce the free viewpoint image that tracks the movement of the head, thereby allowing the user to experience viewing of a large screen. The display device 500 may cause a sound image to be oriented according to the movement of the image.

Figure 3:
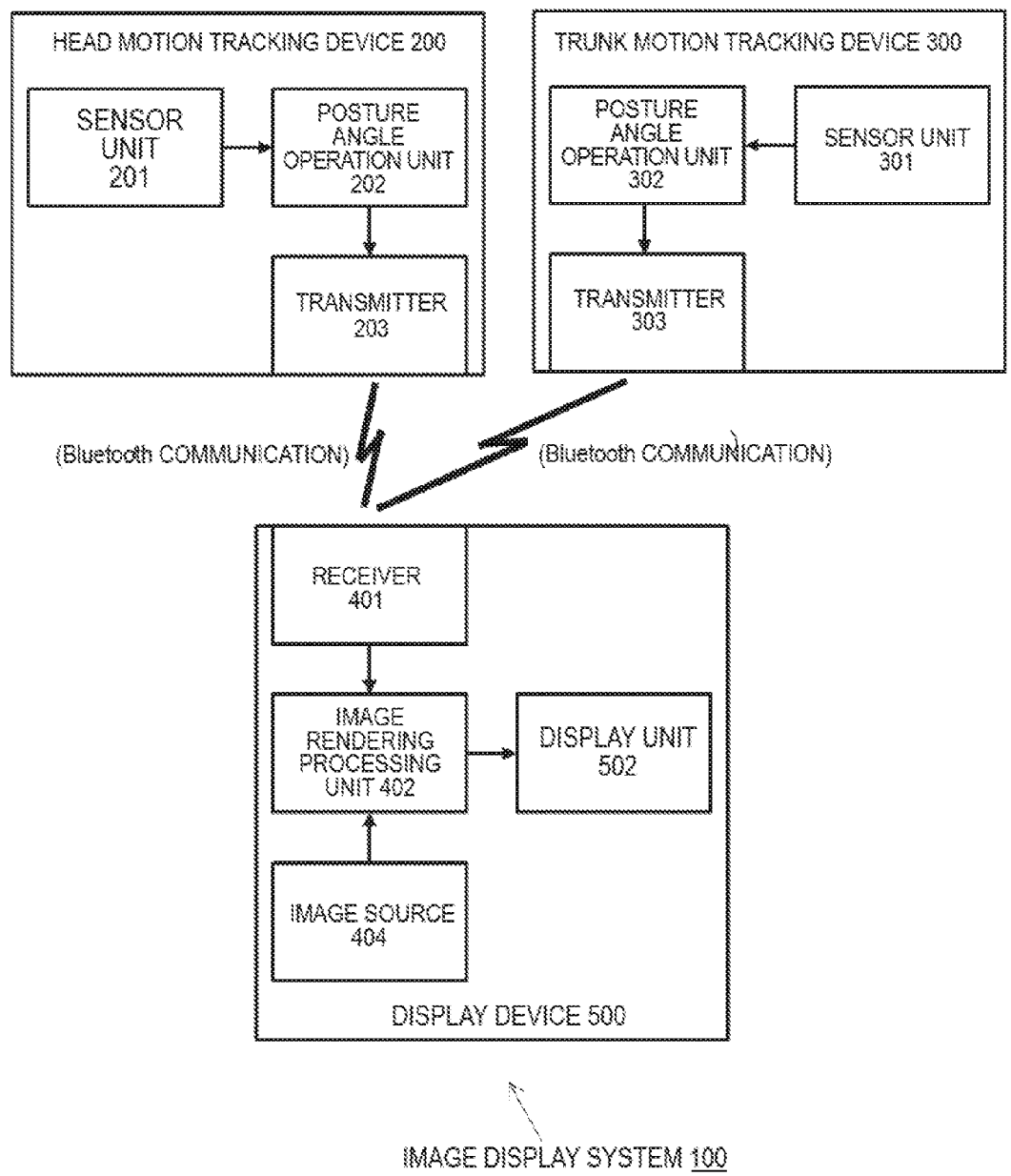
FIG. 3 is a diagram illustrating a modification of the image display system 100.

FIG. 3 illustrates schematically a modification of the image display system 100. In the example illustrated in FIGS. 1 and 2, the image display system 100 is configured to include four separate devices, that is, the head motion tracking device 200, the trunk motion tracking device 300, the image rendering device 400, and the display device 500. However, in the example illustrated in FIG. 3, the function of the image rendering device 400 is equipped in the display device 500. In FIG. 3, the same components as those included in FIG. 1 are denoted by the same reference numerals. As illustrated in FIG. 1, if at least one of the head motion tracking device 200 or the trunk motion tracking device 300 is configured as an optional product to be sold separately from the display device 500 (an accompanying item such as accessories), the display device 500 will be compact, lightweight, and inexpensive.

Figure 4:
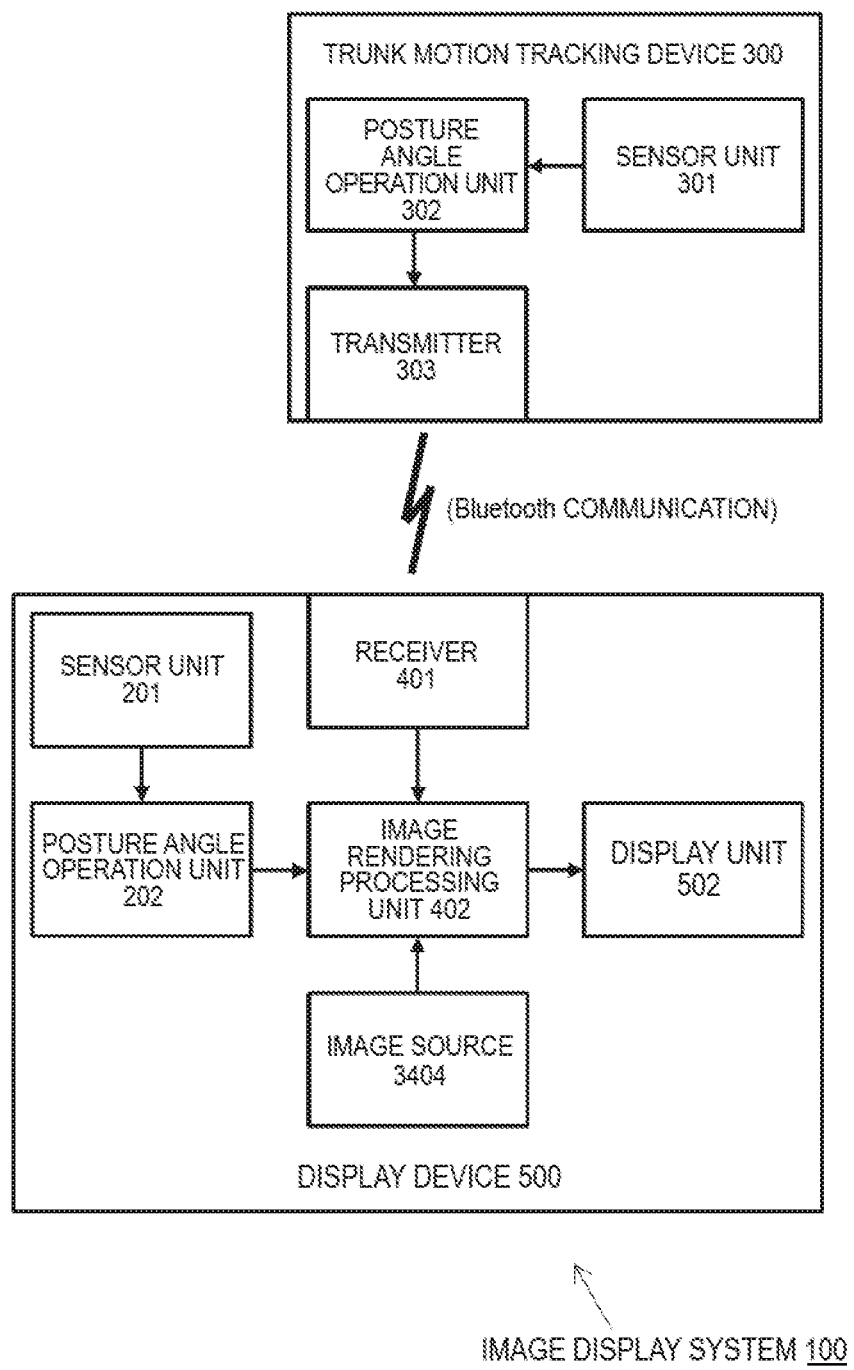
FIG. 4 is a diagram illustrating another modification of the image display system 100.

FIG. 4 illustrates schematically another modification of the image display system 100. In the example illustrated in FIGS. 1 and 2, the image display system 100 is configured to include four separate devices, that is, the head motion tracking device 200, the trunk motion tracking device 300, the image rendering device 400, and the display device 500. However, in the example illustrated in FIG. 4, the functions of the head-mounted display and the image rendering device 400 are equipped in the display device 500. In FIG. 4, the same components as those included in FIG. 1 are denoted with the same reference numerals. As illustrated in FIG. 1, only the trunk motion tracking device 300 may be configured to serve as a device to be connected externally to the display device 500.

Figure 5:
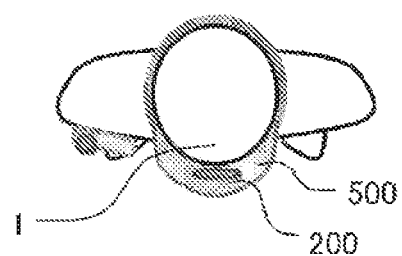
FIG. 5 is a top view of the user who wears a display device 500.
Figure 6:
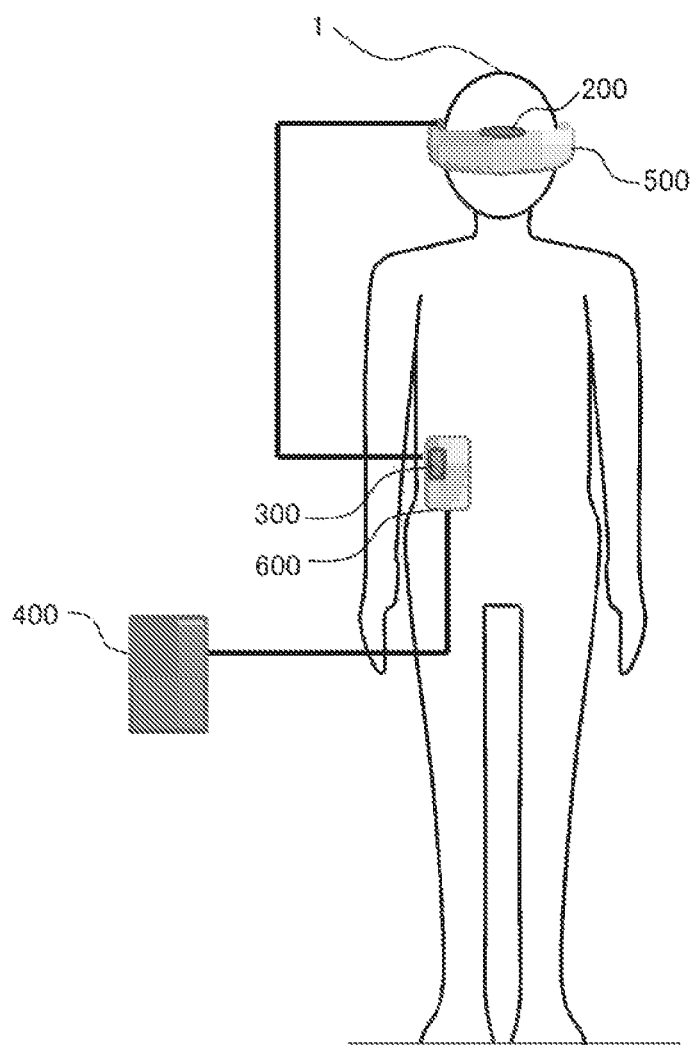
FIG. 6 is a front view of the user who wears the display device 500.

FIGS. 5 and 6 illustrate how a user 1 uses the image display system 100. FIG. 5 is a top view of the user 1 who wears the display device 500, and FIG. 6 is a front view of the user 1 who wears the display device 500.

The display device 500 is a head-mounted display, and has an appearance configuration that is easy to be worn on the head of a person such as eyeglass like or hat like configuration. The user 1 wears the display device 500 on the head. The head motion tracking device 200 is similarly attached to the head of the user 1 to detect the posture information of the head of the user 1, as accessories of the display device 500.

As illustrated in FIG. 6, the trunk motion tracking device 300 is attached to the trunk of the user 1 to detect the posture information of the trunk of the user 1. In the illustrated example, although the trunk motion tracking device 300 is attached to near the waist of the user 1, it may be attached to a part other than the waist, such as arm or shoulder, as long as the posture information to be detected can correspond to the orientation of the trunk of the user 1. In the illustrated example, the trunk motion tracking device 300 is contained in a box 600 that is attached to the trunk of the user 1.

The box 600 may be a dedicated device, or may be equipment with a built-in gyro sensor, such as a game console controller. In the latter case, the box 600 is situated between the display device 500, such as a head-mounted display and the trunk motion tracking device 300. The trunk motion tracking device 300 can be configured as equipment that integrally includes the function of the image rendering device 400, such as a smartphone or tablet terminal. A way for the user 1 to attach the trunk motion tracking device 300 to the trunk is optional, and the box 600 is not necessarily provided between them. In view of the user's usability, it is preferable to allow the user to select optionally the position where the trunk motion tracking device 300 is attached rather than defining the attachment position strictly. As one example, it is envisaged that a state where the user places it in a pocket or a state where the user hooks it on a belt. In addition to this, the number of the trunk motion tracking device 300 attached to the trunk of the user 1 is not limited to one, but two or more devices may be arranged, thereby detecting the orientation of the trunk depending on the number of devices with high accuracy.

As described above, the connections between the head motion tracking device 200 and the image rendering device 400 and between the trunk motion tracking device 300 and the image rendering device 400 are established via wireless communication such as Bluetooth (registered trademark) communication or a high-speed wired inface such as universal serial bus (USB).

The user 1 changes the orientation of his head or trunk while the user is viewing an image displayed on the display device 500. The image rendering device 400 generates a free viewpoint image based on the direction detected by the head motion tracking device 200 and the trunk motion tracking device 300, and then outputs it to the display device 500.

The head-mounted display that is applied as the display device 500 may be configured as any one of a so-called immersive, see-through, and video see-through.

The immersive head-mounted display is attached to the head or face of the user to cover the eyes of the user, as one example, and is provided with a display unit, such as LCD and OLED, arranged to face the user's eyes. For this reason, the user who wears the immersive head-mounted display is difficult to view the outside scenery (i.e., real world scenery). In other words, only the video image displayed on a display unit falls within the field of view, and thus the sense of immersion can be provided for the user who is viewing the image.

The see-through head-mounted display is provided with a transparent virtual image optical system including a half mirror or a light guide plate so that the virtual image optical system may face the user's eyes, and displays an image on the inside of the virtual image optical system. Thus, the user who wears the see-through head-mounted display can view the outside scenery through the image, even during the time when the user is viewing the image displayed on the inside of the virtual image optical system.

The video see-through head-mounted display is attached to the head or face of the user to cover the eyes of the user, as one example, and is provided with a display unit arranged to face the user's eyes, which is similar to the immersive head-mounted display. However, the video see-through head-mounted display can be configured to further include an image capture unit, such as a camera, used to capture the surrounding scenery, thereby displaying an image captured along the line of sight of the user by the image capture unit on the display unit. Although the user who wears the video see-through head-mounted display fails to view directly the outside scenery, but the user can observe the outside scenery through the captured image displayed on the display unit.

B. Image Rendering Process of Free Viewpoint Image

An image rendering process of the free viewpoint image displayed by the image display system 100 will be described.

In the case of the head-mounted display provided with the gyro sensor mounted on only the user's head (e.g. see Patent Literatures 2 and 3), it is possible to detect the line of sight of the user from the displacement of the head, thereby presenting the free viewpoint image that tracks the movement of the user's head.

Figure 7:
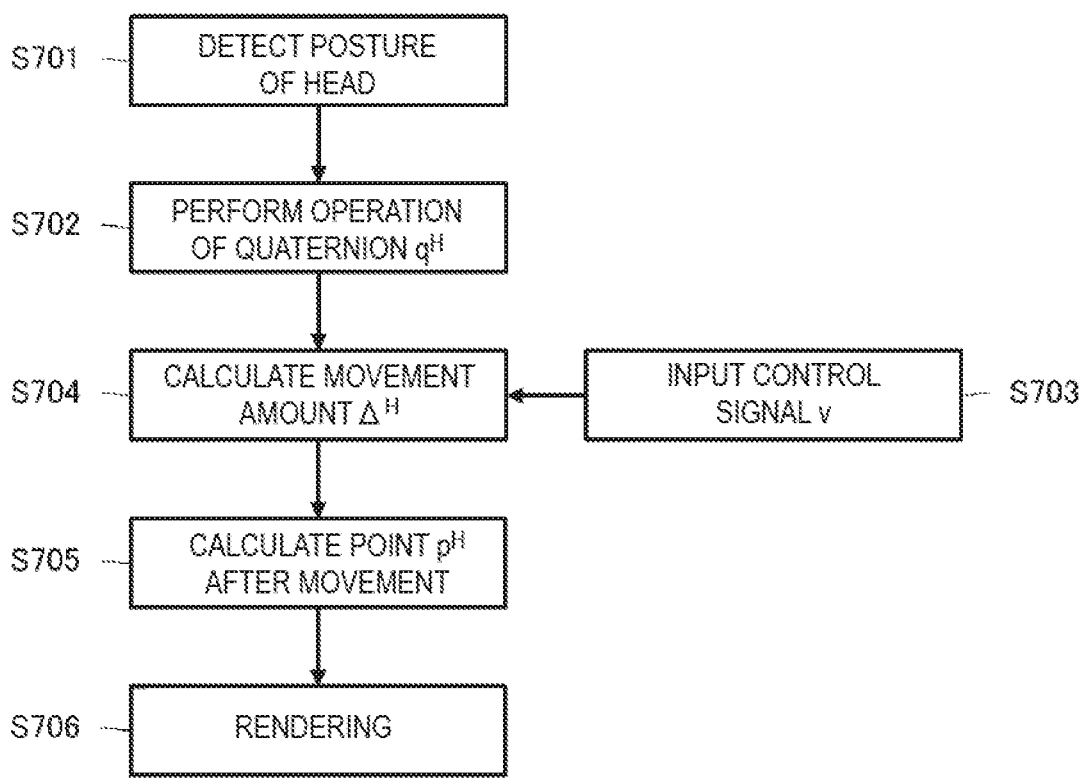
FIG. 7 is a flowchart illustrating a processing procedure for rendering a free viewpoint image that tracks only a movement of a user's head.

FIG. 7 illustrates, by a flowchart, a processing procedure for rendering a free viewpoint image that tracks the movement of the user's head in the image display system 100. To track only the movement of the user's head means that only the posture of the user's head is considered, but not considering the user's body. More specifically, this indicates that the image rendering device 400 receives only posture information $q^H$ from the head motion tracking device 200 as an input, but does not receive posture information $q^B$ from the trunk motion tracking device 300.

In the head motion tracking device 200, the sensor unit 201 detects a posture of the user's head (step S701), and the posture angle operation unit 202 performs an operation on a quaternion $q^H$ that indicates the posture of the user's head based on the detection result (step S702) and transmits it to the image rendering device 400 through the transmitter 203.

The image rendering device 400 receives the quaternion $q^H$ indicating the posture of the head from the head motion tracking device 200 and receives a control signal v, such as velocity and amount of displacement, used to move in the free viewpoint space as an input (step S703). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

The image rendering processing unit 402 calculates a movement amount $\Delta^H$ in the free viewpoint space depending on the inputted control signal v (step S704). In this process routine, the posture information of the user's trunk that can be obtained from the trunk motion tracking device 300 is not used, and thus the control signal v can be associated with only the posture information $q^H$ of the user's head, and the movement amount $\Delta^H$ is determined as shown in the following formula (2). In the following formula (2), g is a function used to calculate the movement amount $\Delta^H$ in the free viewpoint space from the control signal v indicating the velocity or amount of displacement based on the quaternion $q^H$ indicating the posture information.

[Math. 2]

$$\Delta^H = g(v, q^H) \tag{2}$$

The image rendering processing unit 402 calculates a point $p^H$ obtained by moving the current point by the movement amount $\Delta^H$ in the direction of the posture $q^H$ of the user's head (the line-of-sight direction) in the free viewpoint space (step S705). A point $p^H$ associated with the posture $q^H$ of the user's head is set to a new viewpoint position, an image $I^H$ viewed in the line-of-sight direction represented as the quaternion $q^H$ is rendered from the viewpoint position $p^H$ (step S706), and then the rendered image is displayed on the display device 500 as an output. The free viewpoint image $I^H$ obtained in this procedure is generated based on a function f used to generate an image being viewed from the viewpoint position $p^H$ and the line-of-sight direction $q^H$, as shown in the following formula (3).

[Math. 3]

$$I^H = f(p^H, q^H) \tag{3}$$

During the time from the detection of the posture of the user's head to the display of the image that tracks the posture, there is a delay in time due to various causes, such as a transmission delay that occurs when the head motion tracking device 200 transmits the posture information to the image rendering device 400, a rendering delay that occurs when the image rendering device 400 performs the rendering process on an image, and a display delay that occurs when the display device 500 displays image rendering data. If the delay time increases, the image corresponding to the previous posture of the head is rendered. Thus, the bodily sensation in which the image tracks the motion of the head is degraded, which causes disadvantageously motion sickness to be experienced by the user. Thus, the image rendering device 400 may be configured to perform image correction by considering the delay time. As one example, the image processing technique disclosed in the specification of PCT/2014/079205 assigned to the present applicant is applicable (the image rendering device 400 predicts the delay time and then predicts posture angle data after a lapse of the delay time from the received posture angle data, thereby rendering the image in the predicted delay time).

In the process procedure shown in FIG. 7, the image rendering device 400 generates the free viewpoint image $I^H$ that tracks the posture of the user's head. However, when only the posture of the user's head is detected while ignoring the posture of the user's trunk, the user interface (UI) is in a state where the line-of-sight direction goes straight regardless of the orientation of the trunk or in a state where the determination of the direction of movement in the free viewpoint space by a game controller causes the UI to deviate from the real space unnaturally. In other words, the detection of the posture displacement based on only the head causes the space to move to the front of the trunk (the front direction of the trunk) in the state where the line of sight does not match the front of the trunk (e.g. to move forward while the head is angled to one lateral side), which prevents a natural behavior in the real space from being represented into a video image. This significantly decreases a sense in which the user is immersed in the video image.

Meanwhile, in the image display system 100 according to the present embodiment, it is possible to orient individually the line-of-sight direction and the trunk orientation of the user in the free viewpoint space displayed on the display device 500, based on the posture information $q^H$ of the user's head that is obtained by the head motion tracking device 200 and the posture information $q^B$ of the user's trunk that is obtained by the trunk motion tracking device 300.

Figure 8:
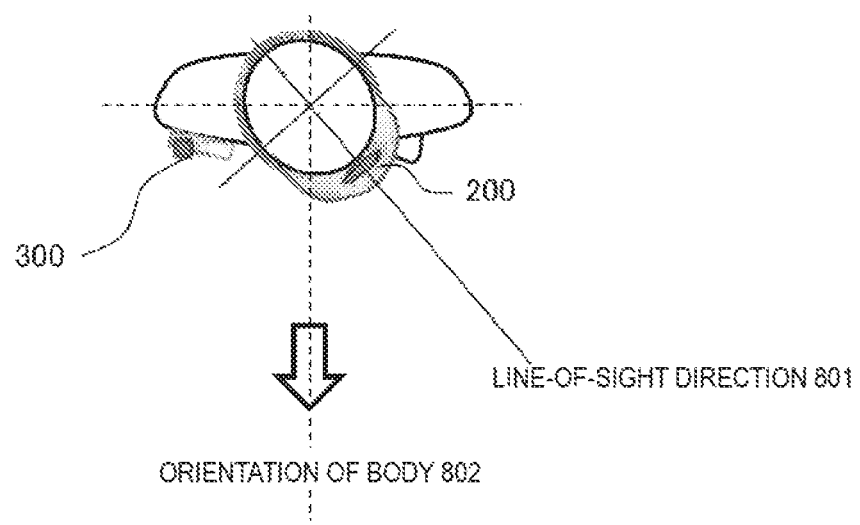
FIG. 8 is a diagram illustrating how a user's line-of-sight direction and a trunk's orientation are individually oriented in a free viewpoint space based on posture information supplied from each of a head motion tracking device 200 and a trunk motion tracking device 300.

FIG. 8 illustrates how the line-of-sight direction and the trunk orientation of the user are individually oriented in the free viewpoint space. As illustrated, the line-of-sight direction denoted by reference numeral 801 is oriented based on the posture information $q^H$ supplied from the head motion tracking device 200. The orientation of the body that is denoted by reference numeral 802 is oriented based on the posture information $q^B$ supplied from the trunk motion tracking device 300. When the image rendering device 400 renders the free viewpoint image, it is possible to obtain the direction in which the user recognizes it as the front by setting the orientation 802 of the body to the orientation of the body on the free viewpoint space.

Thus, the image display system 100 according to the present embodiment allows a natural behavior in the real space in which the space is moved to the front of the trunk (the front direction of the trunk) in the state where the line of sight does not match the front of the trunk (e.g. to move forward while the head is angled to one lateral side) to be represented using the free viewpoint image. The UI is prevented from being in a state where the line-of-sight direction is moved regardless of the orientation of the trunk (e.g. to move forward while the head is angled to one lateral side) or in a state where the determination of the direction of movement in the free viewpoint space by a game controller causes the UI to deviate from the real space unnaturally.

Figure 9:
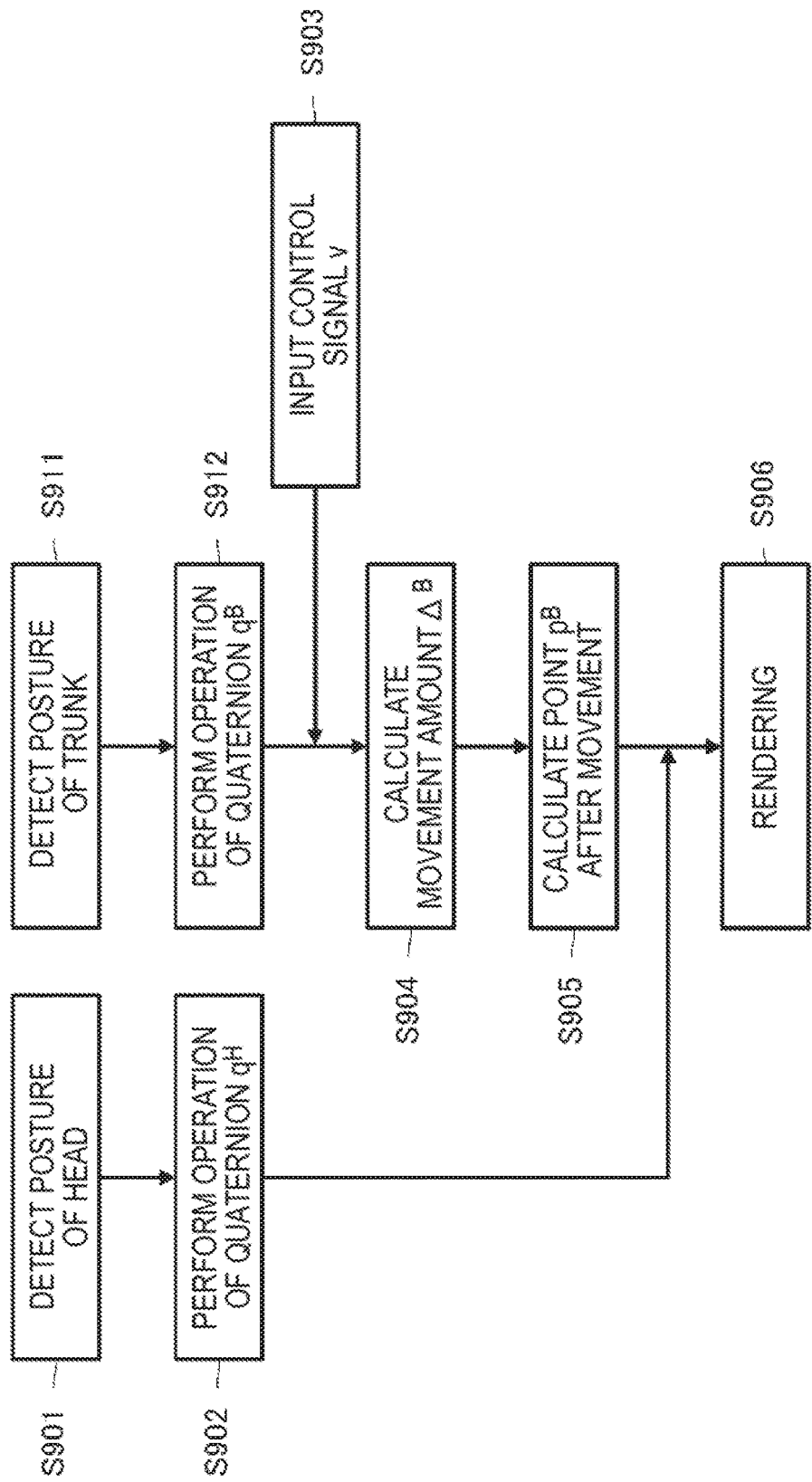
FIG. 9 is a flowchart illustrating a processing procedure for rendering a free viewpoint image by considering both user's head posture and body posture.

FIG. 9 illustrates, by a flowchart, a processing procedure for rendering a free viewpoint image by considering both a posture of the head and a posture of the body of the user in the image display system 100.

In the head motion tracking device 200, the sensor unit 201 detects a posture of the user's head (step S901), and the posture angle operation unit 202 performs an operation on a quaternion $q^H$ that indicates the posture of the user's head based on the detection result (step S902) and transmits it to the image rendering device 400 through the transmitter 203.

In the trunk motion tracking device 300, the sensor unit 301 detects a trunk posture of the user (step S911). The posture angle operation unit 202 performs an operation on a quaternion $q^B$ that indicates the posture of the user's trunk based on the detection result (step S912) and transmits it to the image rendering device 400 through the transmitter 303.

Then, the image rendering device 400 receives the quaternion $q^H$ indicating the head posture from the head motion tracking device 200 and the quaternion $q^B$ indicating the trunk posture from the trunk motion tracking device 300, and receives a control signal v, such as velocity and amount of displacement, used to move in the free viewpoint space as an input (step S903). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

The image rendering processing unit 402 calculates a movement amount $\Delta^B$ in the free viewpoint space depending on the inputted control signal v (step S904). In this process procedure, the posture information of the user's trunk that can be obtained from the trunk motion tracking device 300 is used, and thus the control signal v can be associated with the posture information $q^B$ of the user's trunk, and the movement amount $\Delta^B$ is determined as shown in the following formula (4). In the following formula (4), g is a function for calculating the movement amount $\Delta^B$ in the free viewpoint space from the control signal v indicating the velocity or amount of displacement based on the quaternion $q^B$ indicating the posture information (same as the above).

[Math. 4]

$$\Delta^B = g(v, q^B) \quad (4)$$

The image rendering processing unit 402 calculates a point $p^B$ obtained by moving the current point by the movement amount $\Delta^B$ in the direction of the user's trunk posture $q^B$ (i.e., the front direction of the trunk) in the free viewpoint space (step S905). The point $p^B$ associated with the user's trunk posture information $q^B$ is set to a viewpoint position in the free viewpoint space, an image $I^B$ viewed in the line-of-sight direction represented as the quaternion $q^H$ is rendered from the viewpoint position $p^B$ (step S906), and then the rendered image is displayed on the display device 500 as an output. The free viewpoint image $I^H$ generated in this procedure is generated based on a function f for generating an image being viewed from the viewpoint position $p^H$ and the line-of-sight direction $q^H$ (same as the above), as shown in the following formula (5).

[Math. 5]

$$I^B = f(p^B, q^H) \quad (5)$$

In the above formula (4), the movement amount $\Delta^B$ is calculated based on the user's trunk posture information $q^B$. Thus, in step S905, it is possible to calculate the point $p^B$ after movement that is more natural than the case where the above formula (2) that calculates the movement amount $q^H$ based on the user's head posture information is used. Thus, the free viewpoint image $I^B$ generated in step S906 become a UI that is more natural than the free viewpoint image $I^H$ generated in accordance with the process procedure shown in FIG. 7. In other words, it is possible to represent a natural behavior in the real space by moving the space to the front of the trunk (front direction of the trunk) in the state where the line of sight is not coincident with the front of the trunk (e.g. to move forward while the head is angled to one lateral side).

Also in the processing procedure shown in FIG. 9, the image rendering may be performed by considering the delay time that occurs during the time from the detection of the user's head and trunk postures to the display of the image (same as the above).

In the present embodiment, as described with reference to FIG. 8, the line-of-sight direction 801 of the user in the free viewpoint space is oriented based on the posture information $q^H$ supplied from the head motion tracking device 200, and the orientation 802 of the body of the user in the free viewpoint space is oriented based on the posture information $q^B$ supplied from the trunk motion tracking device 300. Then, the orientation 802 of the body is set to the direction in which the user recognizes it as the front.

Figure 10:
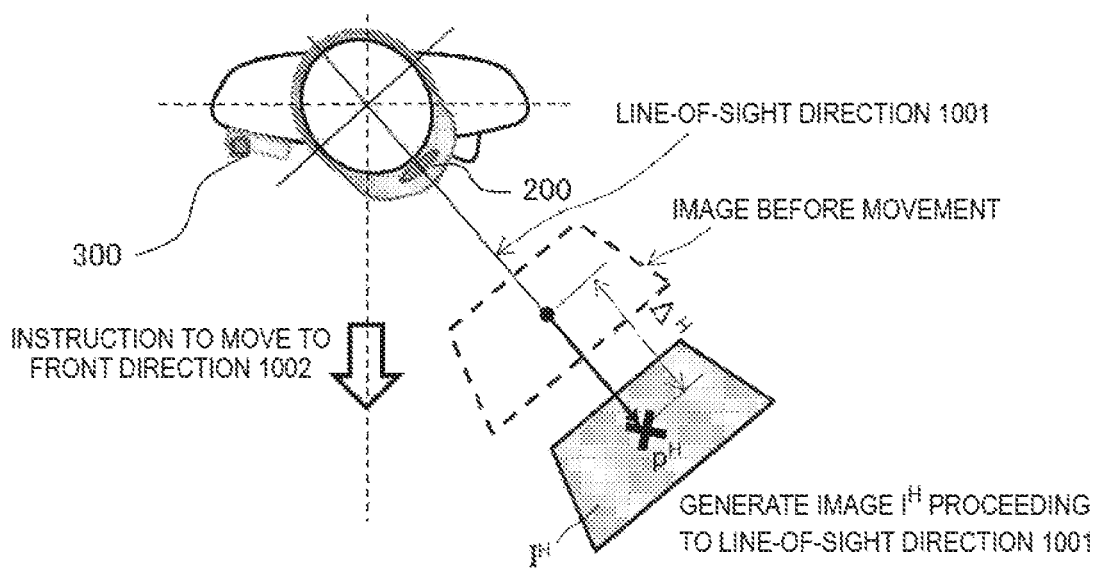
FIG. 10 is a diagram illustrated to describe a free viewpoint image that tracks only a movement of a user's head.

As shown in FIG. 7 and the above formula (2), when only the head posture information is considered, the movement amount in the free viewpoint space is calculated in association with the head posture $q^H$, that is, the orientation of the line of sight. In this case, with reference to FIG. 8, there will be provided an image in which the free viewpoint space is moved toward the line-of-sight direction 801 rather than the user's front direction 802, and thus the image movement is unnatural. As one example, the control signal v for instructing to move to the front direction is inputted using a joystick or the like of a game controller. FIG. 10 illustrates a free viewpoint image that tracks only the movement of the user's head. As illustrated, in the posture in which the user tilts his head (line-of-sight direction 1001) to the left side, even though an instruction to direct to the front direction 1002 is inputted from a controller, an image $I^H$ is generated at a point that is moved by a movement amount $\Delta^H$ in the direction of the user's head posture $q^H$ (line-of-sight direction) 1001 from the current point and is viewed in the line-of-sight direction $q^H$ from the point $p^H$. In other words, even though there is an instruction to move to the front direction, the image $I^H$ to be generated proceeds to the line-of-sight direction 1001, and thus it will be unnatural.

Meanwhile, as shown in FIG. 9 and the above formula (4), there is a case where the movement amount in the free viewpoint space is calculated by considering the head and trunk posture information. In this case, with reference to FIG. 8, the line-of-sight direction 801 is oriented based on the head posture information and the user's body orientation 802 in the free viewpoint space is oriented based on the trunk posture information. Thus, it is possible to calculate the movement amount in the free viewpoint space by recognizing the body orientation 802 as the position of the front of the user. Thus, it is possible to render a natural free viewpoint image that tracks the movement of the user's head and body. As one example, the control signal v for instructing to move to the front direction is inputted using a joystick or the like of a game controller.

Figure 11:
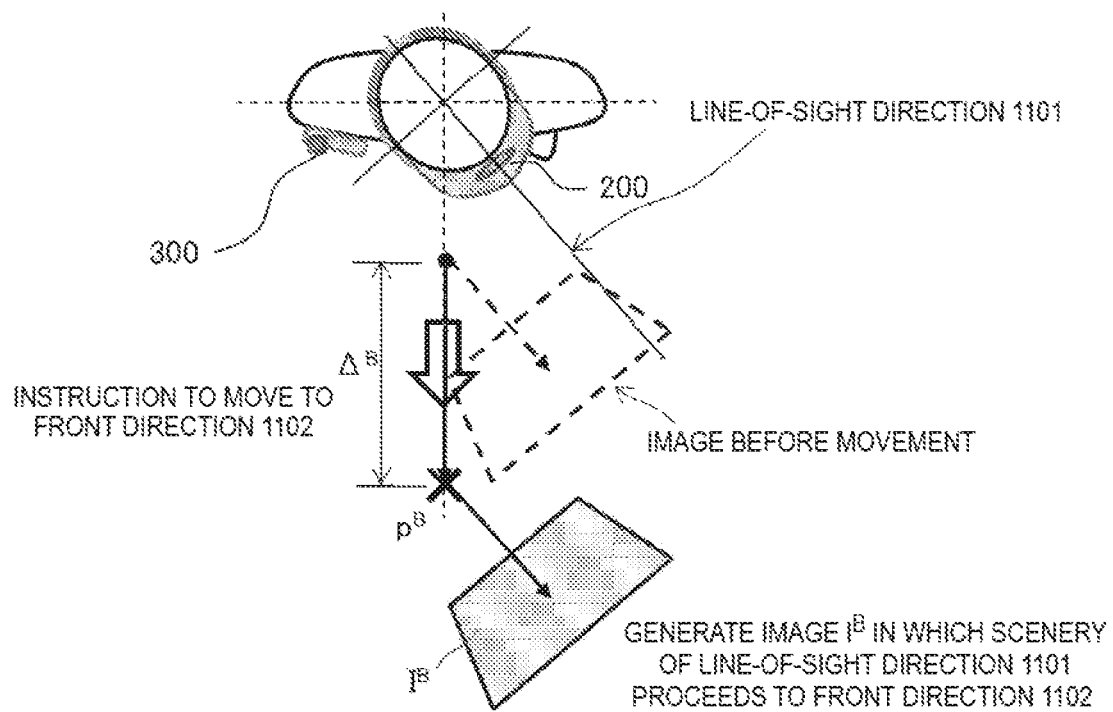
FIG. 11 is a diagram illustrated to describe a free viewpoint image generated by considering user's head posture and body posture.

FIG. 11 illustrates a free viewpoint image generated by considering the head posture and the body posture of the user. As illustrated, in the posture in which the user tilts his head (line-of-sight direction 1001) to the left side, when the instruction to direct to the front direction 1102 is inputted from a controller, an image $I^B$ is generated at a point that is moved by a movement amount $\Delta^B$ in the direction of the user's trunk posture $q^B$ (front direction of the trunk) 1102 from the current point and is viewed in the line-of-sight direction $q^H$ from the point $p^B$. In other words, the natural image $I^B$ in which the scenery of the line-of-sight direction 1101 proceeds to the front direction 1102 is generated.

C. Calibration

When the line-of-sight direction and the trunk orientation of the user are oriented individually in the free viewpoint space as described above, it is necessary to associate a coordinate system in which the head motion tracking device 200 detects the user's head posture with a coordinate system in which the trunk motion tracking device 300 detects the user's trunk posture.

When the head motion tracking device 200 is incorporated into a head-mounted display serving as the display device 500, the position at which the head motion tracking device 200 is attached to the user's head can be defined substantially strictly in a mechanical way. This is because the user wears it at a substantially fixed position every time wearing it in terms of the fact that the user views through the image display unit for each of the left and right eyes.

On the other hand, a method of defining strictly the initial orientation to be attached to the user's trunk in a mechanical way can be also considered for the trunk motion tracking device 300. However, in a mode of using the trunk motion tracking device 300 to be contained in the box 600 that is attached to the trunk of the user (e.g. refer to FIG. 6), it is difficult to define strictly the attachment position, as in the head-mounted display.

In view of the user usability, it is preferable for the user to select the attachment position of the trunk motion tracking device 300 by the user's own choice rather than being strictly defined. As one example, it is envisaged that a state where the user places it in a pocket or a state where the user hooks it on a belt.

Thus, it is necessary to determine, by calibration, a parameter that is used to mutually convert a coordinate system in which the head motion tracking device 200 detects the user's head posture and a coordinate system in which the trunk motion tracking device 300 detects the user's trunk posture. When the position to which the head motion tracking device 200 is attached is defined strictly, the initial position of the trunk motion tracking device 300 may be calibrated. In other words, it is possible for the user to determine the position to which the trunk motion tracking device 300 is attached by the user's own choice as long as the calibration is performed only one time after the user wears the trunk motion tracking device 300.

The calibration is performed by the determination of the corresponding relationship between the detection coordinate system of the head motion tracking device 200 and the detection coordinate system of the trunk motion tracking device 300 in a state where the user faces straight ahead with the user's head and body being arranged in line (i.e., upright posture). Examples of a trigger for performing the calibration include items (a) to (c) described below.

(a) User's manipulation of a trigger button provided in the head motion tracking device 200 or the trunk motion tracking device 300.

(b) User's selection to perform the calibration through graphical user interface (GUI) displayed on the display device 500.

(c) User enters a specified input for the head motion tracking device 200 or the trunk motion tracking device 300 (e.g. a moment at which the rotation angular velocity of the head motion tracking device 200 and the trunk motion tracking device 300 when the head shakes twice vertically are synchronized is set as a trigger).

Alternatively, the calibration may be performed automatically in the image display system 100, rather than causing the user to perform a trigger manipulation of the calibration as described in the above items (a) to (c).

As one example, an image inducing the user to take an upright posture may be displayed (or, indicating by sound) for a certain period, and the calibration may be performed during the period.

Alternatively, rotational displacement of the coordinate system for a certain period from the state where the user initiates the free viewpoint viewing may be recorded, and the coordinate system of the sensor unit 301 of the trunk motion tracking device 300 in the state where the user is upright may be determined from the log data of the rotational displacement of the coordinate system and the property of the human body.

Figure 12:
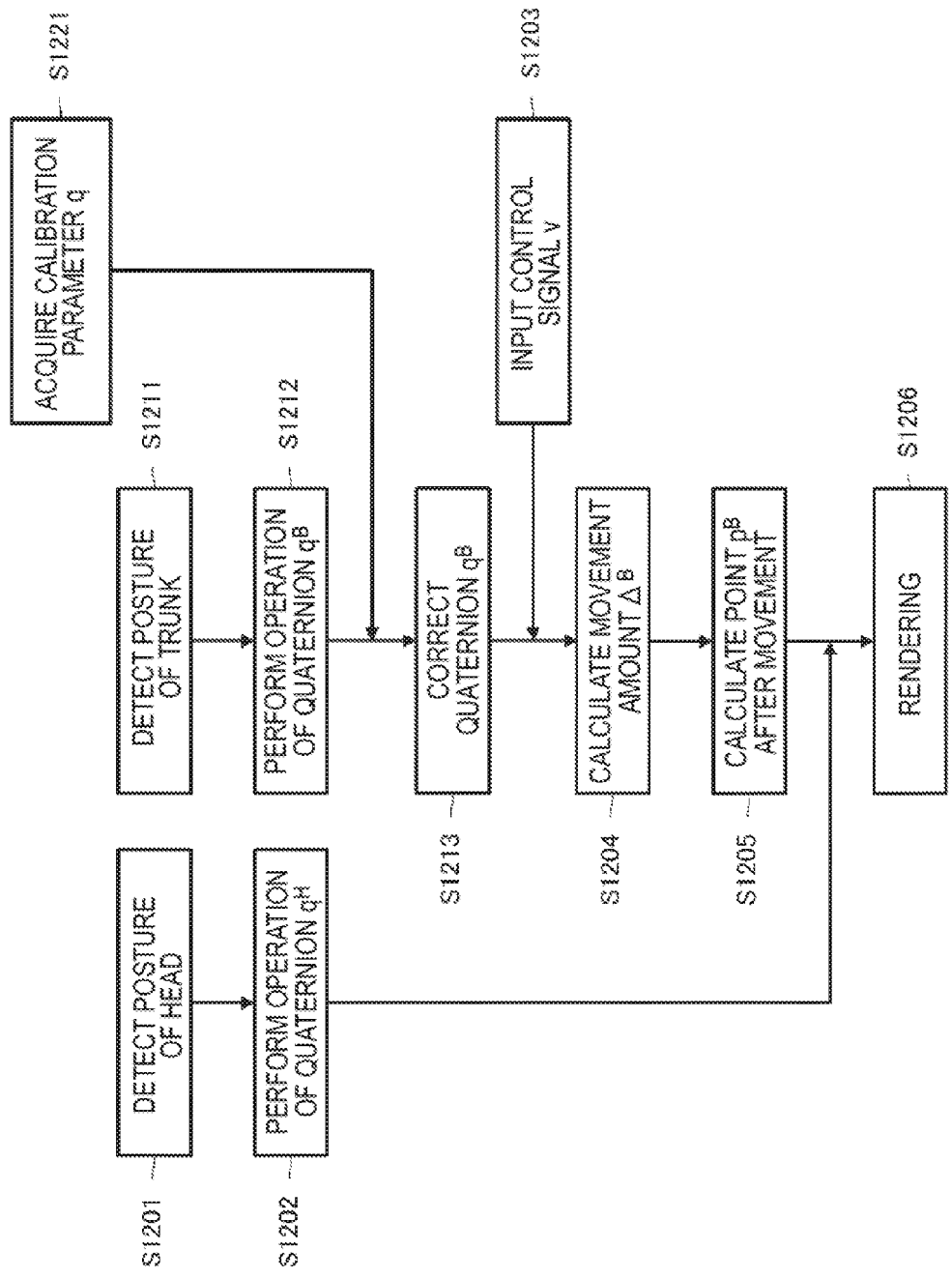
FIG. 12 is a flowchart illustrating a processing procedure for rendering a free viewpoint image using posture information corrected by a calibration parameter.

FIG. 12 illustrates, by a flowchart, a processing procedure for rendering a free viewpoint image using posture information corrected by the calibration parameter in the image display system 100. The processing procedure illustrated is performed during a normal operation after performing the calibration.

In the head motion tracking device 200, the sensor unit 201 detects a posture of the user's head (step S1201), and the posture angle operation unit 202 performs an operation on a quaternion $q^H$ that indicates the posture of the user's head based on the detection result (step S1202) and transmits it to the image rendering device 400 through the transmitter 203.

In the trunk motion tracking device 300, the sensor unit 301 detects a trunk posture of the user (step S1211). The posture angle operation unit 202 performs an operation on a quaternion $q^B$ that indicates the posture of the user's trunk based on the detection result (step S1212) and transmits it to the image rendering device 400 through the transmitter 303.

The image rendering device 400 receives the quaternion $q^H$ indicating the head posture from the head motion tracking device 200 and receives the quaternion $q^B$ indicating the trunk posture from the trunk motion tracking device 300. Then, a calibration quaternion q is obtained as the calibration parameter (step S1221). Then, the quaternion $q^B$ indicating the trunk posture is corrected using the calibration parameter q, and the corrected quaternion $q'^B$ is obtained (step S1213).

The calibration quaternion q is a parameter used to mutually convert a coordinate system in which the head motion tracking device 200 detects the user's head posture and a coordinate system in which the trunk motion tracking device 300 detects the user's trunk posture, and is determined by calibration. When the posture information is represented using quaternion, the calibration parameter used to correct it is a calibration quaternion represented in quaternion form. In step S1213, the quaternion $q^B$ indicating the trunk posture is corrected by multiplying the calibration quaternion q from the left in accordance with the following formula (6).
[Math. 6]

$$q'^B = q q^B \quad (6)$$

Then, the image rendering device 400 receives a control signal v, such as velocity and amount of displacement, used to move in the free viewpoint space as an input (step S1203). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

The image rendering processing unit 402 calculates a movement amount $\Delta^B$ in the free viewpoint space depending on the inputted control signal v (step S1204). In this process procedure, the posture information of the user's trunk that can be obtained from the trunk motion tracking device 300 is used, and thus the control signal v can be associated with the corrected posture information $q'^B$ of the user's trunk, and the movement amount $\Delta^B$ is determined as shown in the following formula (7). In the following formula (7), g is a function for calculating the movement amount $\Delta^B$ in the free viewpoint space from the control signal v indicating the velocity or amount of displacement based on the corrected quaternion $q'^B$ indicating the posture information (same as the above).
[Math. 7]

$$\Delta^B = g(v, q'^B) \quad (7)$$

The image rendering processing unit 402 calculates a point $p^B$ obtained by moving the current point by the movement amount $\Delta^B$ in the direction of the user's trunk posture $q^B$ (i.e., the front direction of the trunk) in the free viewpoint space (step S1205). The point $p^B$ associated with the user's trunk posture information $q^B$ is set to a viewpoint position in the free viewpoint space, an image $I^B$ viewed in the line-of-sight direction represented as the quaternion $q^H$ is rendered from the viewpoint position $p^B$ (step S1206), and then the rendered image is displayed on the display device 500 as an output. The free viewpoint image $I^H$ generated in this procedure is generated based on a function f for generating an image being viewed from the viewpoint position $p^H$ and the line-of-sight direction $q^H$ (same as the above), as shown in the above formula (5).

Also in the processing procedure shown in FIG. 12, the image rendering may be performed by considering the delay time that occurs during the time from the detection of the user's head and trunk postures to the display of the image (same as the above).

Figure 13:
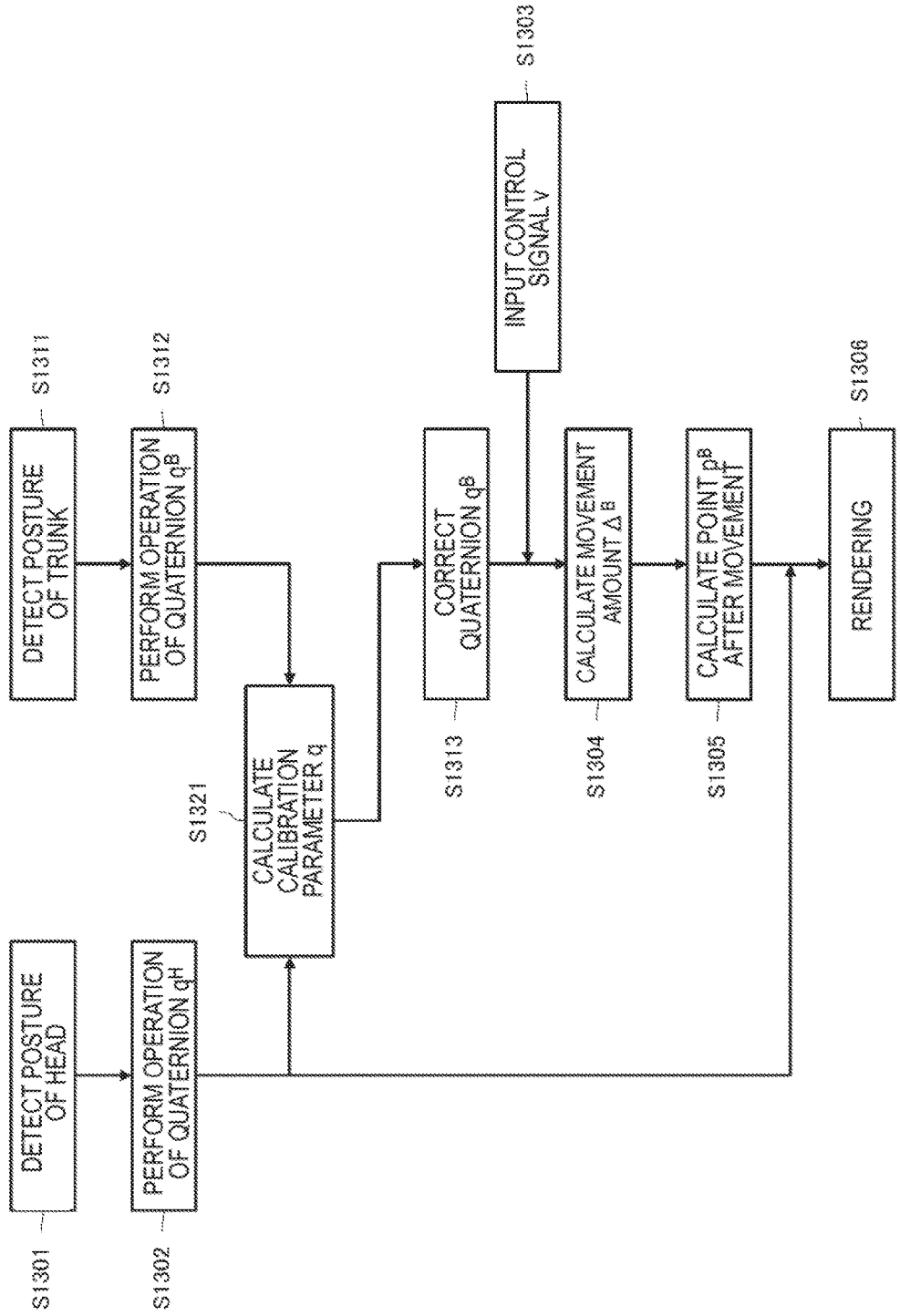
FIG. 13 is a flowchart illustrating another processing procedure for rendering a free viewpoint image using posture information corrected by a calibration parameter.

FIG. 13 illustrates, by a flowchart, another processing procedure for rendering a free viewpoint image using posture information corrected by the calibration parameter in the image display system 100. In the processing procedure illustrated, the calibration is performed in accordance with the explicit manipulations as described in the above items (a) to (c).

In the head motion tracking device 200, the sensor unit 201 detects a posture of the user's head (step S1301), and the posture angle operation unit 202 performs an operation on a quaternion $q^H$ that indicates the posture of the user's head based on the detection result (step S1302) and transmits it to the image rendering device 400 through the transmitter 203.

In the trunk motion tracking device 300, the sensor unit 301 detects a trunk posture of the user (step S1311). The posture angle operation unit 202 performs an operation on a quaternion $q^B$ that indicates the posture of the user's trunk based on the detection result (step S1312) and transmits it to the image rendering device 400 through the transmitter 203.

The image rendering device 400 calculates a calibration quaternion q using the following formula (8) from the quaternion $q^H$ indicating the user's head posture sent from the head motion tracking device 200 and the quaternion $q^B$ indicating the user's trunk posture sent from the trunk motion tracking device 300 (step S1321), and stores it temporarily. In the following formula (8), the superscript "−1" of "$q^{B-1}$" indicates the inverse of the quaternion "$q^B$" (the same hereinafter).

[Math. 8]

$$q = q^H q^{B-1} \qquad (8)$$

Then, the image rendering device 400 corrects the quaternion $q^B$ indicating the trunk posture by multiplying the calibration quaternion q from the left in accordance with the above formula (6) (step S1313).

Next, the image rendering device 400 receives a control signal v, such as velocity and amount of displacement, used to move in the free viewpoint space as an input (step S1303). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

The image rendering processing unit 402 calculates the movement amount $\Delta^B$ in the free viewpoint space from the control signal v (step S1304). In this process routine, the use of the posture information of the user's trunk that can be obtained from the trunk motion tracking device 300 makes it possible to associate the control signal v with the corrected posture information $q'^B$ of the user's trunk, thereby determining the movement amount $\Delta^B$ in accordance with the above formula (7).

The image rendering processing unit 402 calculates a point $p^B$ obtained by moving the current point by the movement amount $\Delta^B$ in the direction of the user's trunk posture $q^B$ (i.e., the front direction of the trunk) in the free viewpoint space (step S1305). The point $p^B$ associated with the user's trunk posture information $q^B$ is set to a viewpoint position in the free viewpoint space, an image $I^B$ viewed in the line-of-sight direction represented as the quaternion $q^H$ is rendered from the viewpoint position $p^B$ (step S1306), and then the rendered image is displayed on the display device 500 as an output. The free viewpoint image $I^H$ generated in this procedure is generated based on a function f for generating an image being viewed from the viewpoint position $p^H$ and the line-of-sight direction $q^H$ (same as the above), as shown in the above formula (5).

Also in the processing procedure shown in FIG. 13, the image rendering may be performed by considering the delay time that occurs during the time from the detection of the user's head and trunk postures to the display of the image (same as the above).

Figure 14:
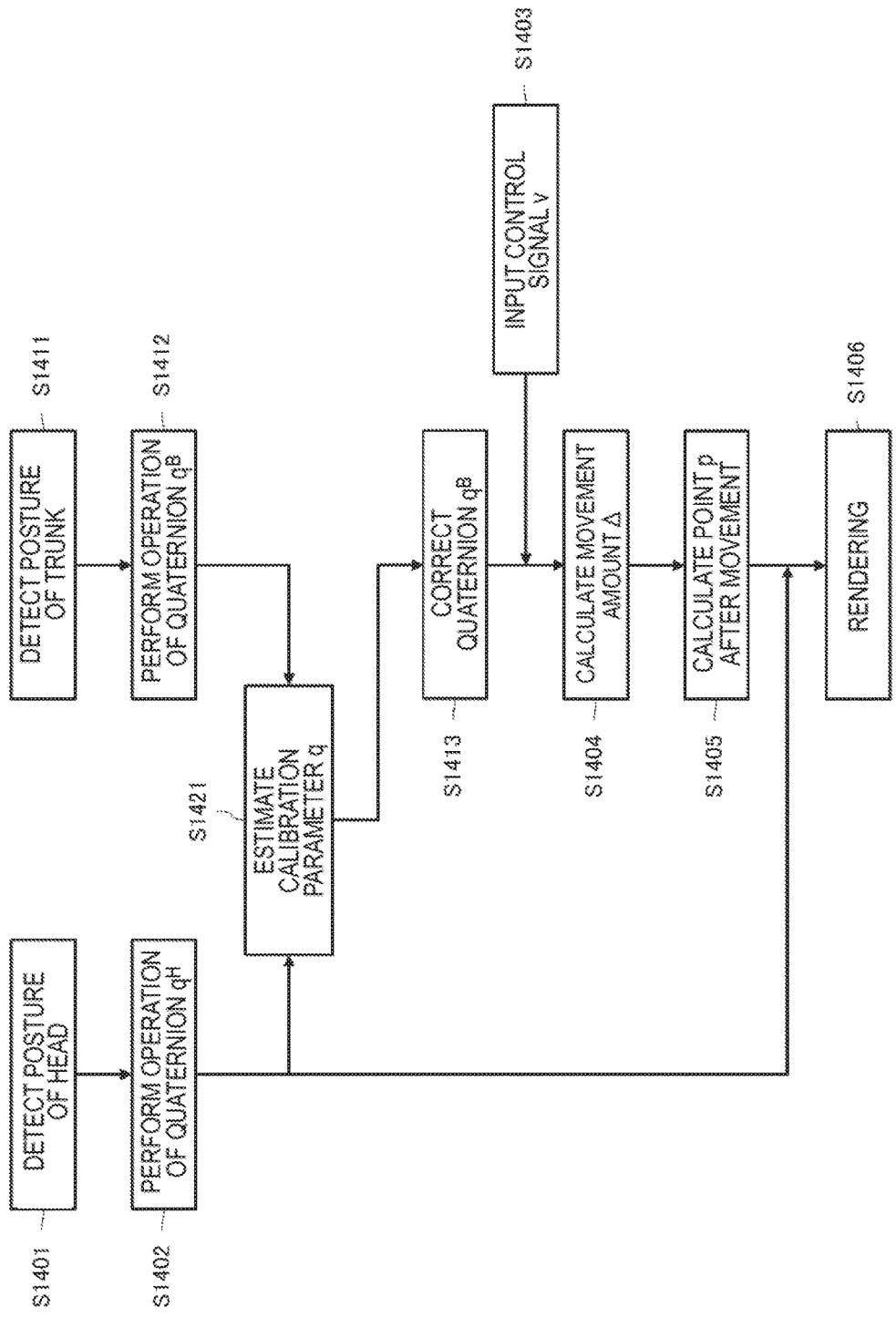
FIG. 14 is a flowchart illustrating yet another processing procedure for rendering a free viewpoint image using posture information corrected by a calibration parameter.

FIG. 14 illustrates, by a flowchart, yet another processing procedure for rendering a free viewpoint image using posture information corrected by the calibration parameter in the image display system 100. In the processing procedure illustrated, the calibration is performed automatically based on the rotational displacement of the coordinate system for a certain period and the property of the human body.

In the head motion tracking device 200, the sensor unit 201 detects a posture of the user's head (step S1401), and the posture angle operation unit 202 performs an operation on a quaternion $q^H$ that indicates the posture of the user's head based on the detection result (step S1402) and transmits it to the image rendering device 400 through the transmitter 203.

In the trunk motion tracking device 300, the sensor unit 301 detects a trunk posture of the user (step S1411). The posture angle operation unit 202 performs an operation on a quaternion $q^B$ that indicates the posture of the user's trunk based on the detection result (step S1412) and transmits it to the image rendering device 400 through the transmitter 203.

The image rendering device 400 estimates the calibration quaternion q based on the rotational displacement of the coordinate system for a certain period and the property of the human body (step S1421). In this procedure, the estimation of the calibration quaternion q is performed constantly rather than only at a particular point in time. A method of estimating the calibration quaternion q in step S1421 will be described in more detail later.

Then, the image rendering device 400 corrects the quaternion $q^B$ indicating the trunk posture by multiplying the calibration quaternion q from the left in accordance with the above formula (6) (step S1413).

Next, the image rendering device 400 receives a control signal v, such as velocity and amount of displacement, used to move in the free viewpoint space as an input (step S1403). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

The image rendering processing unit 402 calculates the movement amount $\Delta^B$ in the free viewpoint space from the control signal v (step S1404). In this process routine, the use of the posture information of the user's trunk that can be obtained from the trunk motion tracking device 300 makes it possible to associate the control signal v with the corrected posture information $q'^B$ of the user's trunk, thereby determining the movement amount $\Delta^B$ in accordance with the above formula (7) (same as the above).

The image rendering processing unit 402 calculates a point $p^B$ obtained by moving the current point by the movement amount $\Delta^B$ in the direction of the user's trunk posture $q^B$ (i.e., the front direction of the trunk) in the free viewpoint space (step S1405). The point $p^B$ associated with the user's trunk posture information $q^B$ is set to a viewpoint position in the free viewpoint space, an image $I^B$ viewed in the line-of-sight direction represented as the quaternion $q^H$ is rendered from the viewpoint position $p^B$ (step S1406), and then the rendered image is displayed on the display device 500 as an output. The free viewpoint image $I^H$ generated in this procedure is generated based on a function f for generating an image being viewed from the viewpoint position $p^H$ and the line-of-sight direction $q^H$ (same as the above), as shown in the above formula (5).

Also in the processing procedure shown in FIG. 14, the image rendering may be performed by considering the delay time that occurs during the time from the detection of the user's head and trunk postures to the display of the image (same as the above).

Figure 15:
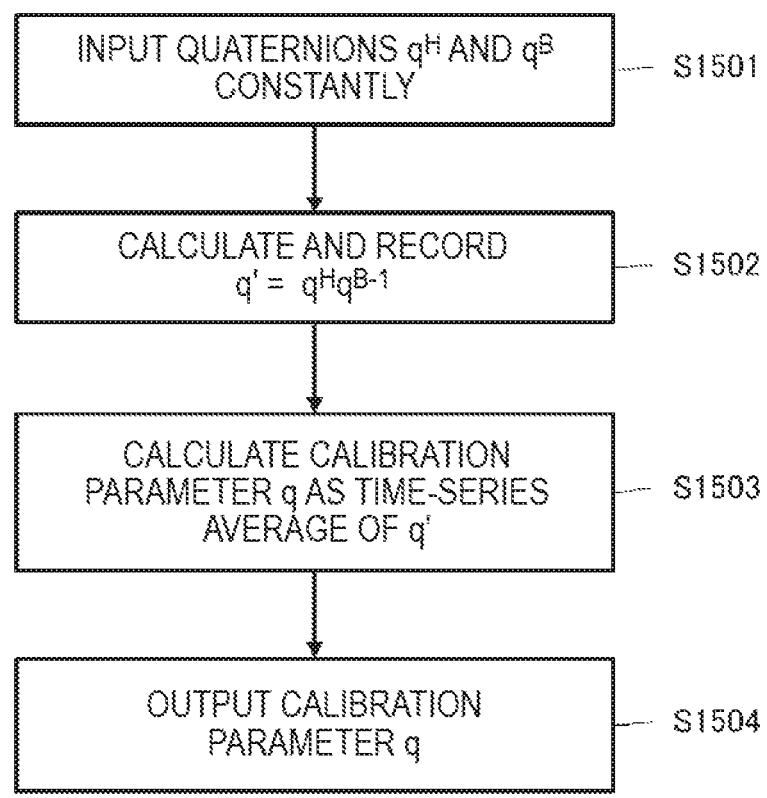
FIG. 15 is a flowchart illustrating a procedure for processing automatic calibration.

FIG. 15 illustrates, by a flowchart, a processing procedure for automatic calibration performed in step S1421 of the flowchart shown in FIG. 14. In the illustrated process procedure, the calibration quaternion q is estimated based on the rotational displacement of the coordinate system for a certain period and the property of the human body. Although this process procedure can be performed in any of the devices 200 to 500 in the image display system 100, the description will be given for the sake of convenience on assumption that the process procedure is performed in the image rendering device 400.

The image rendering device 400 receives, as a constant input, quaternion $q^H$ indicating the user's head posture transmitted from the head motion tracking device 200 and quaternion $q^B$ indicating the user's trunk posture transmitted from the trunk motion tracking device 300, as time-series data (step S1501).

In accordance with the following formula (9), on the basis of the quaternion of the posture information that is newly detected by each of the head motion tracking device 200 and the trunk motion tracking device 300, a new calibration quaternion q' is calculated and is sequentially recorded (step S1502).

[Math. 9]

$$q' = q^H q^{B-1} \qquad (9)$$

The quaternion q' that is calculated by the quaternions $q^H$ and $q^B$ that are detected a moment at which the user faces straight ahead with the user's head and trunk being arranged in line (i.e., upright posture) is proper calibration quaternion. Thus, in this processing procedure, based on the assumption that the user often faces straight ahead with the head and body being arranged in line on the average when the user's head and trunk postures are measured for a long period of time, a final calibration quaternion q is calculated (step S1503) by taking the time-series average of the calibration quaternion q' recorded in step S1502, and is outputted (S1504).

Unlike the case where the calibration is performed in accordance with the explicit manipulations shown in FIG. 13, in the processing procedure shown in FIG. 15, the calibration quaternion q is not a fixed value but varies momentarily, and it is possible to eliminate a disturbance factor, such as a user standing or sitting, to the sensor unit 201 or 301.

In step S1502, when the final calibration quaternion is updated by averaging the time series of the calibration quaternion q', the pre-update calibration quaternion $q_{prev}$ and a newly calculated calibration quaternion q' are interpolated to determine the updated calibration quaternion $q_{updated}$.

Figure 22:
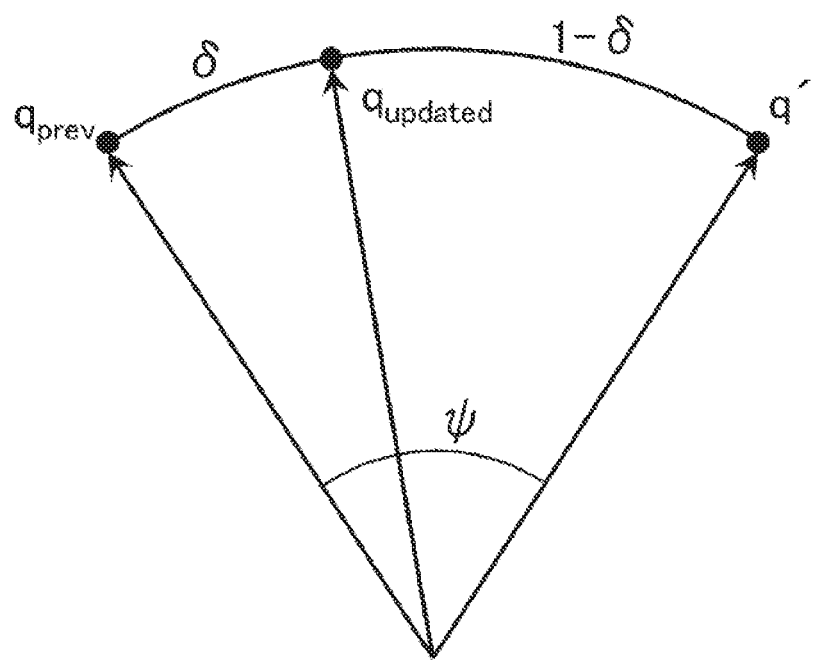
FIG. 22 is a diagram illustrating a method of compensating a quaternion by spherical linear interpolation (Slerp).

The quaternion indicating the posture is described as one point on the three-dimensional sphere. Thus, it is possible to the updated calibration quaternion $q_{updated}$ by the spherical linear interpolation (Slerp) used to perform linear interpolation on the three-dimensional sphere between the quaternions $q_{prev}$ and q', as shown in the following formula (10) and FIG. 22.

[Math. 10]

$$q_{updated} = \text{Slerp}(\delta; q_{prev}, q') = q_{prev}(q_{prev}^{-1} q')^{\delta} \qquad (10)$$

In the above formula (10), the updated calibration quaternion $q_{updated}$ is determined by the weighted averaging of the pre-updated calibration quaternion $q_{prev}$ weighted by a weight (1 3 1 δ) and a newly calculated value q' weighted by δ (interpolation rather than extrapolation). As one example, the weighting factor δ=0.01. The quaternion $q_{updated}$ is updated by the weight 1 at first. Thus, when the user takes a correct posture at the time of start-up (face straight ahead with the head and body arranged in line), the convergence is obtained in a short time.

The operation of Slerp is defined only as binary relation, as shown in the above formula (10). Thus, it is not suitable to calculate the average with a large number of quaternions at the same time (as described above, sequential updating of the quaternion $q_{updated}$ is possible). To solve this problem (i.e., to calculate the average with a large number of quaternions at the same time), the arithmetic mean in the logarithmic space is considered. With a unit vector u, the quaternion q indicating the rotation of the angle θ around u can be represented as shown in the following formula (11). Taking this logarithm, the following formula (12) is obtained.

[Math. 11]

$$q = \cos\frac{\theta}{2} + \sin\frac{\theta}{2}(u_x i + u_y j + u_z k) \qquad (11)$$
$$= \cos\frac{\theta}{2} + u\sin\frac{\theta}{2}$$
$$= \exp\left(u\frac{\theta}{2}\right)$$

[Math. 12]

$$\ln q = u\frac{\theta}{2} \qquad (12)$$

Thus, the time series of calibration quaternion {q'} is mapped onto the three-dimensional space by logarithmic conversion to calculate a representative value, such as arithmetic mean, and then it may be set back to the quaternion by exponential conversion as shown in the following formula (13). When the arithmetic mean is calculated, a necessary process such as removal of outliers may be performed as appropriate.

[Math. 13]

$$\bar{q} = \exp\left(\bar{u}\frac{\bar{\theta}}{2}\right) = \cos\frac{\bar{\theta}}{2} + \bar{u}\sin\frac{\bar{\theta}}{2} \qquad (13)$$

Figure 16:
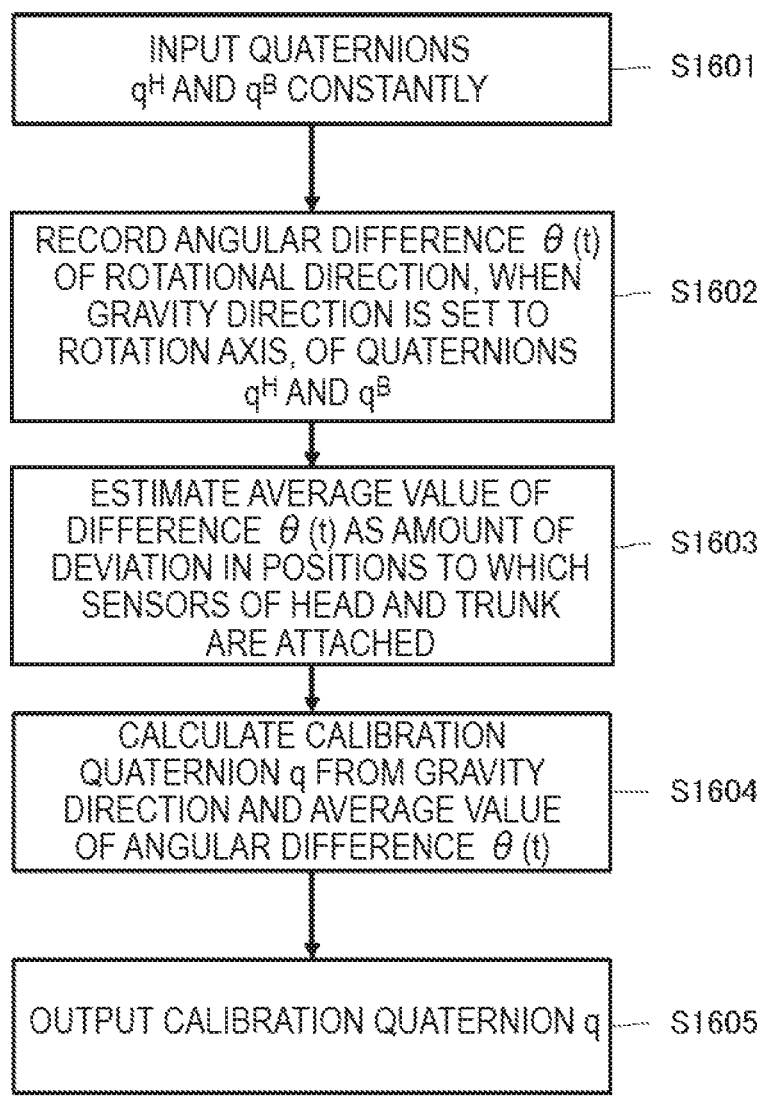
FIG. 16 is a flowchart illustrating another procedure for processing automatic calibration.

FIG. 16 illustrates, by a flowchart, another processing procedure for the automatic calibration performed in step S1421 of the flowchart shown in FIG. 14. In the illustrated processing procedure, the calibration parameter q is estimated based on the rotational displacement of the coordinate system for a certain period and the property of the human body. It is envisaged that a case where the user's head and trunk postures are in the gravity direction as a common axis, and the sensor units 201 and 301 are assumed to have a function to detect the gravity direction and to perform the automatic calibration. Although this process procedure can be performed in any of the devices 200 to 500 in the image display system 100, the description will be given for the sake of convenience on assumption that the process procedure is performed in the image rendering device 400.

The image rendering device 400 receives, as a constant input, quaternion $q^H$ indicating the user's head posture transmitted from the head motion tracking device 200 and quaternion $q^B$ indicating the user's trunk posture transmitted from the trunk motion tracking device 300, as time-series data (step S1601).

The user's head and trunk postures are in the gravity direction as a common axis, and the deviation of the coordinate system is aggregated to only one parameter of θ. Thus, the angular difference θ(t) of a rotation direction, when a gravity direction is set to a rotation axis, of the quaternion $q^H$ indicating the user's head posture and the quaternion $q^B$ indicating the user's trunk posture is calculated and sequentially recorded (step S1602).

Then, an average value of the angular difference θ(t) is calculated, and the calculation result is estimated as the amount of deviation in the positions to which the sensor unit 201 of the head motion tracking device 200 and the sensor unit 301 of the trunk motion tracking device 300 are attached (step S1603).

Thus, the calibration quaternion q are calculated based on the gravity direction and the average value of angular difference θ(t) (step S1604), and are outputted (step S1605).

In step S1604, it is assumed to calculate a calibration quaternion used to convert the quaternion $q^B$ of the user's trunk posture into a representation of a coordinate system that is the same as the quaternion $q^H$ of the head posture.

In the process procedure shown in FIG. 16, the calibration quaternion q is not a fixed value but varies momentarily, and it is possible to eliminate a disturbance factor, such as a user standing or sitting, to the sensor unit 201 or 301 (same as the above).

In step S1603, in addition to the calculation of the simple average of the angular difference θ(t), any calculation method of the following items (d) to (g) may be employed.
(d) Median of frequency distribution
(e) Average value after outlier removal
(f) Combination of velocity and acceleration data for determination material
(g) Combination of limit value of head rotation for determination material The "Combination of velocity and acceleration data for determination material" described in the item (f) uses only data when movement is performed at a velocity and acceleration of a certain range in the free viewpoint space. When the stationary state is kept for a long time, it is not contained in the sample.

In the "Combination of limit value of head rotation for determination material" described in the item (g), the average of the angular differences θ(t) is calculated using only the data in the range of [θ_max−θ_th, θ_min+θ_th], where the limit value θ_th is set to 120 degrees provisionally, the maximum value of the angular difference in the measured data is set to θ_max and the minimum value is set to θ_min.

D. Biosafety Support

In the free viewpoint space presented by the display device 500 such as a head-mounted display, when the user tries to look back by moving the fixation point from the initial position more than 90 degrees, the user may take a motion of the two types of (A) and (B) below.
(A) Turning only head 90 degrees
(B) Turning whole trunk 90 degrees When the free viewpoint image is rendered by detecting only the user's head posture, the user fails to determine whether any one of motion of the above items (A) and (B) is performed. The motion (A) is an unnatural posture, and thus there is concern about the impact on the human body, which leads to product safety problems.

Meanwhile, in the image display system 100 according to the present embodiment, the posture information $q^B$ of the user's trunk that is obtained by the trunk motion tracking device 300 can be used in addition to the posture information $q^H$ of the user's head that is obtained by the head motion tracking device 200, as described above. Thus, it is possible for the user to determine whether the performed motion is either item (A) or (B). Thus, it is possible to introduce a mechanism for reducing or avoiding an unnatural viewing posture of the head due to the free viewpoint view, based on the result obtained by determining the motion.

Figure 17:
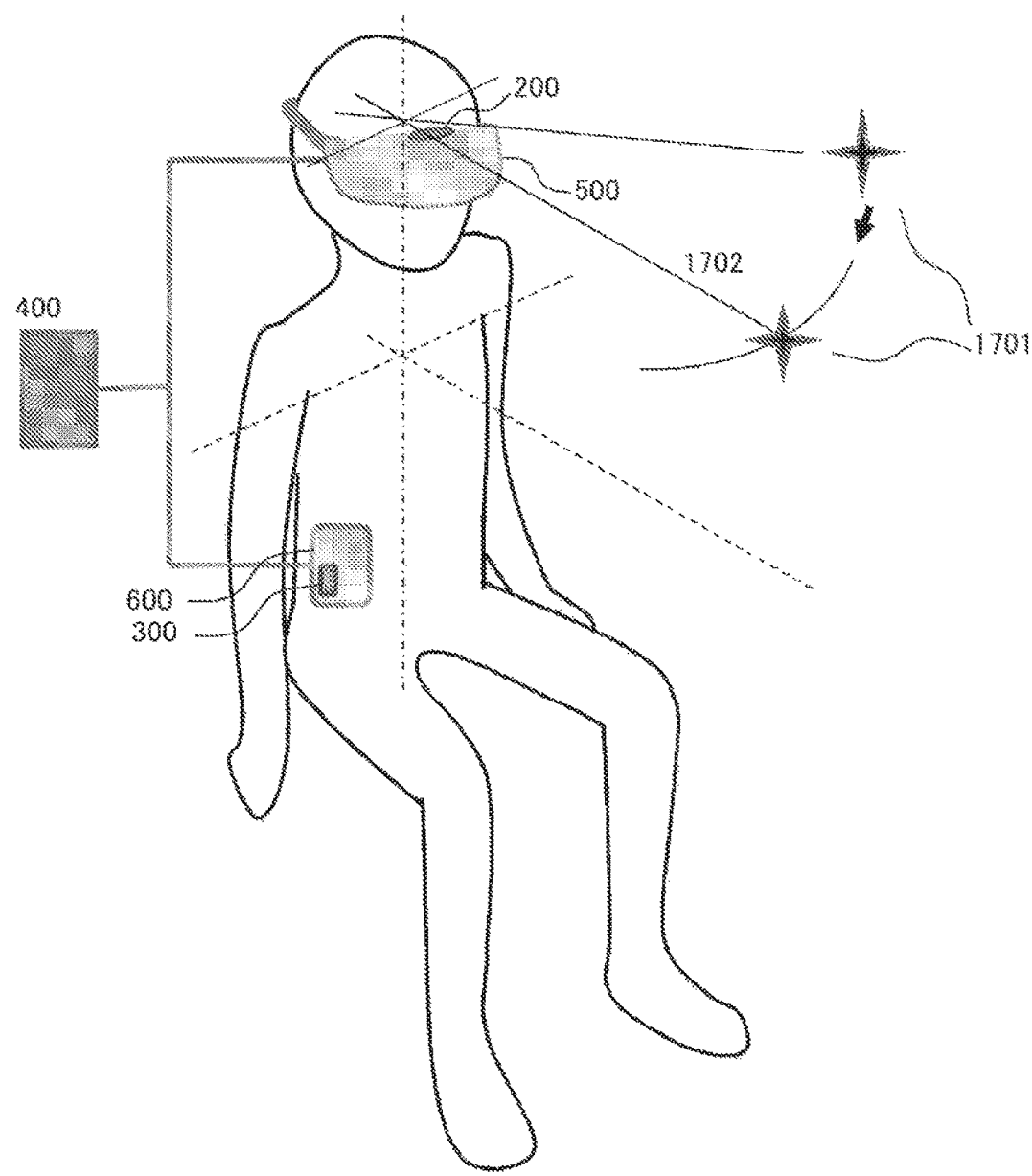
FIG. 17 is a diagram illustrating how to move a free viewpoint image so that a user's line-of-sight direction 1702 returns to an original position toward a front direction of a trunk by moving a fixation point 1701 in the image.

As one example, a first method of reducing or avoiding an unnatural viewing posture of the user may include displaying an image to return the user's head back to the normal position. If it is determined that a state of the motion (A) accompanying an unnatural posture for the user, such as twisting the head or trunk to the extreme, is kept for a certain period from the posture information $q^H$ and $q^B$ of the user's head and trunk, an image to return the user's head back to the original position toward the front direction of the trunk is displayed at a slow speed unconsciously. FIG. 17 illustrates how to move the free viewpoint image so that the user's line-of-sight direction 1702 may return to the original position toward the front direction of the trunk by moving the fixation point 1701 in the image.

In the processing procedures illustrated in FIGS. 9, 12, 13, and 14, the free viewpoint image obtained by mapping the head posture $q^H$ and the trunk posture $q^B$ that are actually detected by the head motion tracking device 200 and the trunk motion tracking device 300, respectively, to the world coordinate system of the free viewpoint space without any modification is rendered. Meanwhile, in the first method of reducing or avoiding an unnatural viewing posture of the user, if the user's posture is unnatural in which the head is twisted relative to the trunk when the user is viewing the free viewpoint image, the world coordinate system of the free viewpoint space is corrected so that the difference between the head posture $q^{H*}$ and the trunk posture $q^{B*}$ in the free viewpoint space may be reduced, which prompts the difference between the head posture $q^H$ and the trunk posture $q^B$ of the user to be reduced even in the real space.

As a second method of reducing or avoiding an unnatural viewing posture of the user may include canceling automatically the tracking the movement of the head (head tracking). If it is determined that a state of the motion (A) accompanying an unnatural posture for the user is kept for a certain period, the tracking the movement of the head (head tracking) is automatically canceled and the user's head is caused to return back to the original position toward the front direction of the trunk with the fixation point displayed on the front, thereby performing the coordinate alignment newly. The head tracking may be cancelled by the user's active manipulation such as pressing a button rather than the automatic cancelation.

In the second method of reducing or avoiding an unnatural viewing posture of the user, the fixation point is kept being displayed on the front by fixing the head posture in the free viewpoint space at the time in which the head tracking is instructed to be cancelled. Then, during the period in which the head tracking is cancelled, the trunk posture in the free viewpoint space is caused to be changed depending on the head posture $q^H$ detected by the head motion tracking device 200 (i.e., by the same amount as the user moving the neck). This prompts the user's head to return to the original posture toward the front direction of the trunk.

Figure 18:
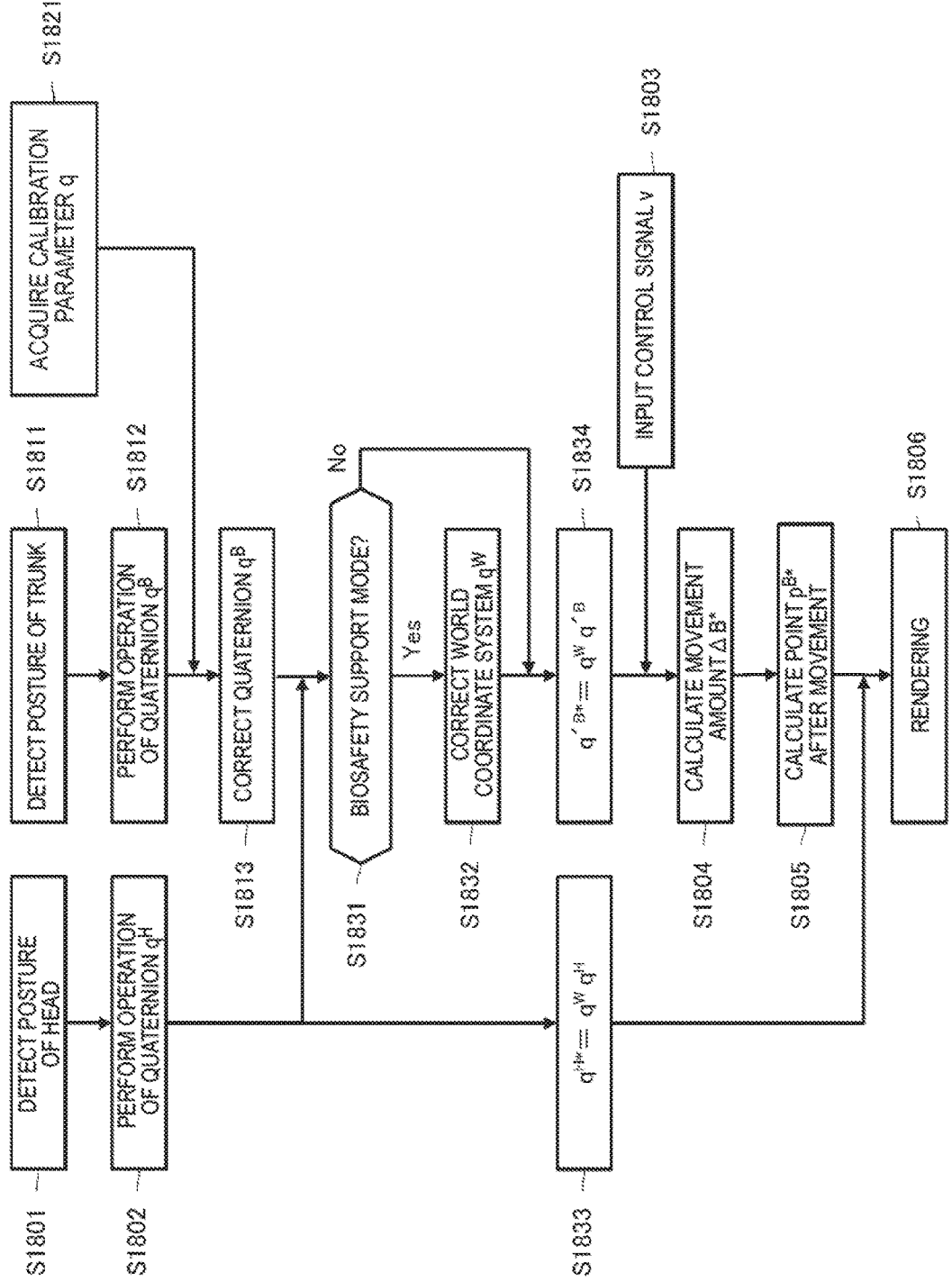
FIG. 18 is a flowchart illustrating an image rendering process procedure for a free viewpoint image, which includes a process of reducing or avoiding an unnatural viewing posture of a user using a first method.

FIG. 18 illustrates, by a flowchart, a processing procedure for rendering a free viewpoint image, which includes a process of reducing or avoiding an unnatural viewing posture of the user using the first method. This process is performed by correcting the world coordinate system of the free viewpoint space. Although not shown in FIG. 18, the initial value of quaternion $q^W$ indicating the correction to the world coordinate system is set to a unit quaternion.

In the head motion tracking device 200, the sensor unit 201 detects a posture of the user's head (step S1801), and the posture angle operation unit 202 performs an operation on a quaternion $q^H$ that indicates the posture of the user's head based on the detection result (step S1802) and transmits it to the image rendering device 400 through the transmitter 203.

In the trunk motion tracking device 300, the sensor unit 301 detects a trunk posture of the user (step S1811). The posture angle operation unit 202 performs an operation on a quaternion $q^B$ that indicates the posture of the user's trunk based on the detection result (step S1812) and transmits it to the image rendering device 400 through the transmitter 303.

The image rendering device 400 receives the quaternion $q^H$ indicating the head posture from the head motion tracking device 200 and receives the quaternion $q^B$ indicating the trunk posture from the trunk motion tracking device 300. Then, a calibration quaternion q is obtained as the calibration parameter (step S1821). Then, the quaternion $q^B$ indicating the trunk posture is corrected using the calibration parameter q, and the corrected quaternion $q'^B$ of the trunk posture is obtained (step S1813).

The calibration quaternion q is a parameter used to mutually convert a coordinate system in which the head motion tracking device 200 detects the user's head posture and a coordinate system in which the trunk motion tracking device 300 detects the user's trunk posture (as described above). A method of acquiring the calibration quaternion q is optional. In step S1813, the quaternion $q^B$ indicating the trunk posture is corrected by multiplying the calibration quaternion q from the left in accordance with the above formula (6).

Then, a mode determination of whether the image display system 100 is in a biosafety support mode is performed based on the head posture quaternion $q^H$ received from the head motion tracking device 200 and the corrected trunk posture quaternion $q'^B$ (step S1831). A method of the mode determination is optional. As one example, the mode determination is performed in accordance with conditions (C1) to (C3) described below.

(C1) Turn off the biosafety support mode in the initial state.

(C2) Turn on the biosafety support mode when a state where a difference ψ between the user's head and trunk postures exceeds a first threshold $ψ_{th1}$ continues for a certain time in the biosafety support mode that is turned off.

(C3) Turn off the biosafety support mode when a difference ψ between the user's head and trunk postures falls below a second threshold $ψ_{th2}$ in the biosafety support mode that is turned on.

In this regard, in the above condition (C2), the difference ψ between the head and trunk postures of the user can be calculated by the following formula (14) using the head posture quaternion $q^H$ and the corrected trunk posture quaternion $q'^B$.

[Math. 14]

$$ψ = \|q^H q'^{B-1}\| \tag{14}$$

It is possible to determine whether the biosafety support mode is to be set by comparing the dimension between the difference ψ between the head and trunk postures that is calculated by the above formula (14) and each of the thresholds $ψ_{th2}$ and $ψ_{th2}$. However, in accordance with the above conditions (C1) to (C3), the switching between on/off of the biosafety support mode may be performed actively (or manually) when the user is in an uncomfortable posture, rather than the automatic switching between on/off of the biosafety support mode.

Then, under the biosafety support mode (Yes in step S1831), the world coordinate system in the free viewpoint space is corrected so that the difference between the head posture and the trunk posture in the free viewpoint space may be reduced (step S1832). If it is not in the biosafety support mode (No in step S1831), the correction process of the world coordinate system is skipped.

The correction of the world coordinate system performed in step S1832 corresponds to a manipulation to bring the head posture to be close to the trunk posture by rotating the world coordinate system gradually. When the quaternion indicating the correction for the world coordinate system is $q^W$, the correction quaternion $q^W$ of the world coordinate system is updated by multiplying a quaternion δ that is close to the trunk posture from the left, as shown in the following formula (15). The initial value of the correction quaternion $q^W$ of the world coordinate system is a unit quaternion (as described above).

[Math. 15]

$$q^W = δq^W \tag{15}$$

The quaternion δ that is gradually close to the trunk posture is a quaternion obtained by dividing the quaternion indicating the difference between the head posture and the trunk posture into n, as shown in the following formula (16). Here, n is the number of partitions for allowing the user to observe without troublesome (or being unaware of it). Alternatively, the quaternion δ that is gradually close to the trunk posture is a quaternion obtained by multiplying the quaternion obtained by normalizing the difference between the head posture and the trunk posture by a small scalar ε, as shown in the following formula (17).

[Math. 16]

$$δ = [q^H q'^{B-1}]^{\frac{1}{n}} \tag{16}$$

[Math. 17]

$$δ = ε \cdot \frac{q^H q'^{B-1}}{[q^H q'^{B-1}]} \tag{17}$$

When the world coordinate system is corrected using the above formula (16), the amount of correction varies every time it occurs. Thus, if the change is large, it is likely to be observed as an unnatural movement. Meanwhile, when the world coordinate system is corrected using the above formula (17), the amount of correction every time it occurs can be made constant.

Then, the correction of each of the head posture $q^{H*}$ and the trunk posture $q'^{B*}$ in the free viewpoint space is performed by multiplying each of the quaternion $q^H$ of the head posture that is calculated in step S1802 and the quaternion $q'^B$ of the trunk posture that is corrected in step S1813 by the quaternion $q^W$ from the left (steps S1833 and S1834), and the manipulation to bring the head posture to be close to the trunk posture is performed by rotating the world coordinate system gradually.

The image rendering device 400 receives a control signal v, such as velocity and amount of displacement, used to move in the free viewpoint space as an input (step S1803). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

Then, in the image rendering processing unit 402, the movement amount $\Delta^{B*}$ corresponding to the inputted control signal v is calculated using the following formula (18), based on the trunk posture $q'^{B*}$ in the free viewpoint space that is obtained by correcting the world coordinate system by the quaternion $q^W$ (step S1804). In the following formula (18), g is a function for calculating the movement amount $\Delta^{B*}$ in the free viewpoint space from the control signal v indicating the velocity and amount of displacement, based on the corrected quaternion $q'^{B*}$ indicating the posture information (same as the above).

[Math. 18]

$$\Delta^{B*}=g(v,q'^{B*}) \tag{18}$$

Then, the image rendering processing unit 402 calculates a point $p^{B*}$ obtained by moving the current point by the movement amount $\Delta^{B*}$ in the direction of the user's trunk posture $q^B$ (the front direction of the trunk) in the free viewpoint space (step S1805). The point $p^{B*}$ associated with the corrected user's trunk posture information $q^{B*}$ is set to a viewpoint position in the free viewpoint space, an image $I^{B*}$ viewed in the line-of-sight direction represented as the corrected quaternion $q^{H*}$ of the head posture is rendered from the viewpoint position $p^{B*}$ (step S1806), and then the rendered image is displayed on the display device 500 as an output. The free viewpoint image $I^{B*}$ generated in this procedure is generated based on a function f for generating an image being viewed from the viewpoint position $p^{B*}$ and the line-of-sight direction $q^{H*}$ (same as the above).

Also in the processing procedure shown in FIG. 18, the image rendering may be performed by considering the delay time that occurs during the time from the detection of the user's head and trunk postures to the display of the image (same as the above).

Figure 19:
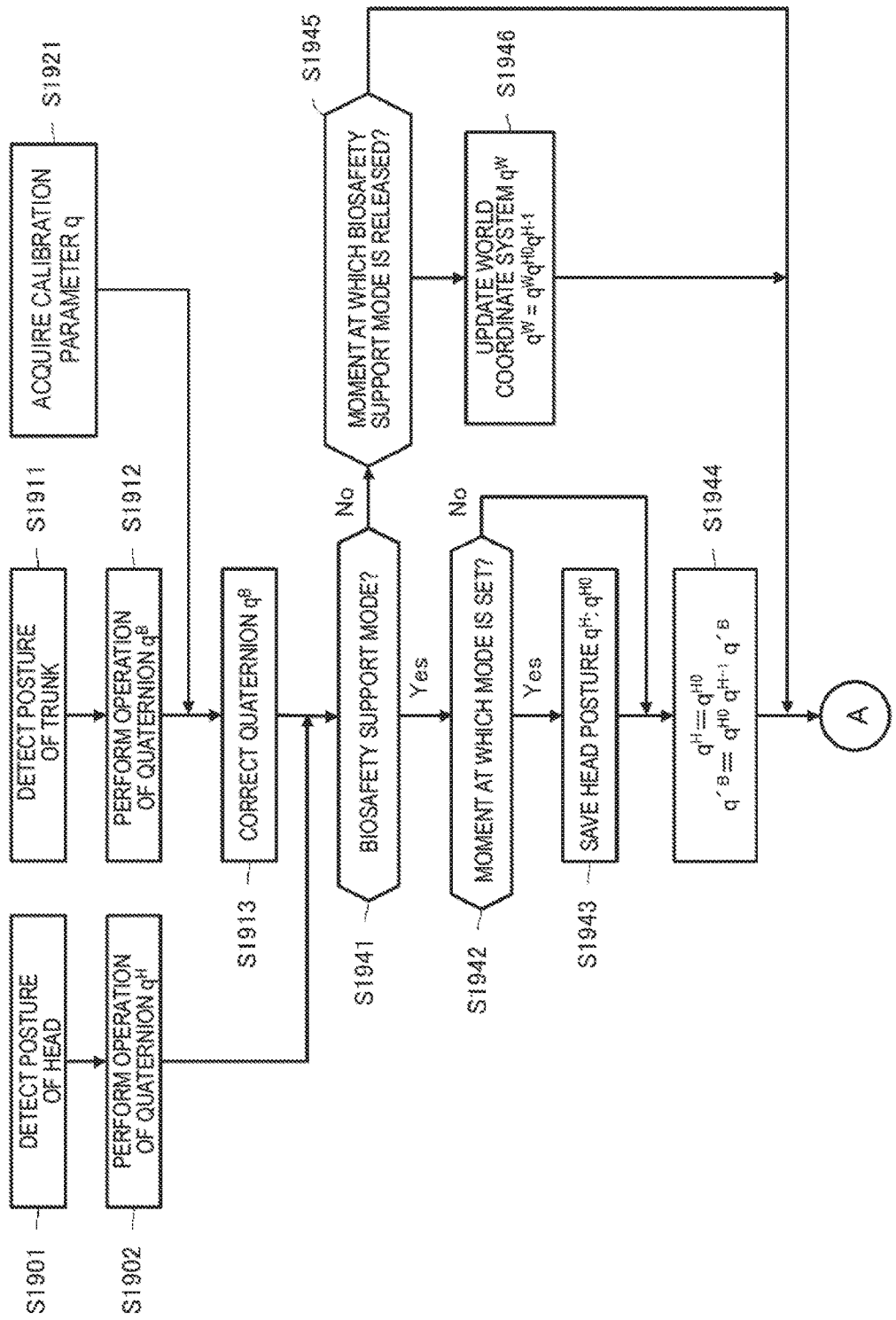
FIG. 19 is a flowchart illustrating an image rendering process procedure for a free viewpoint image, which includes a process of reducing or avoiding an unnatural viewing posture of a user using a second method.
Figure 20:
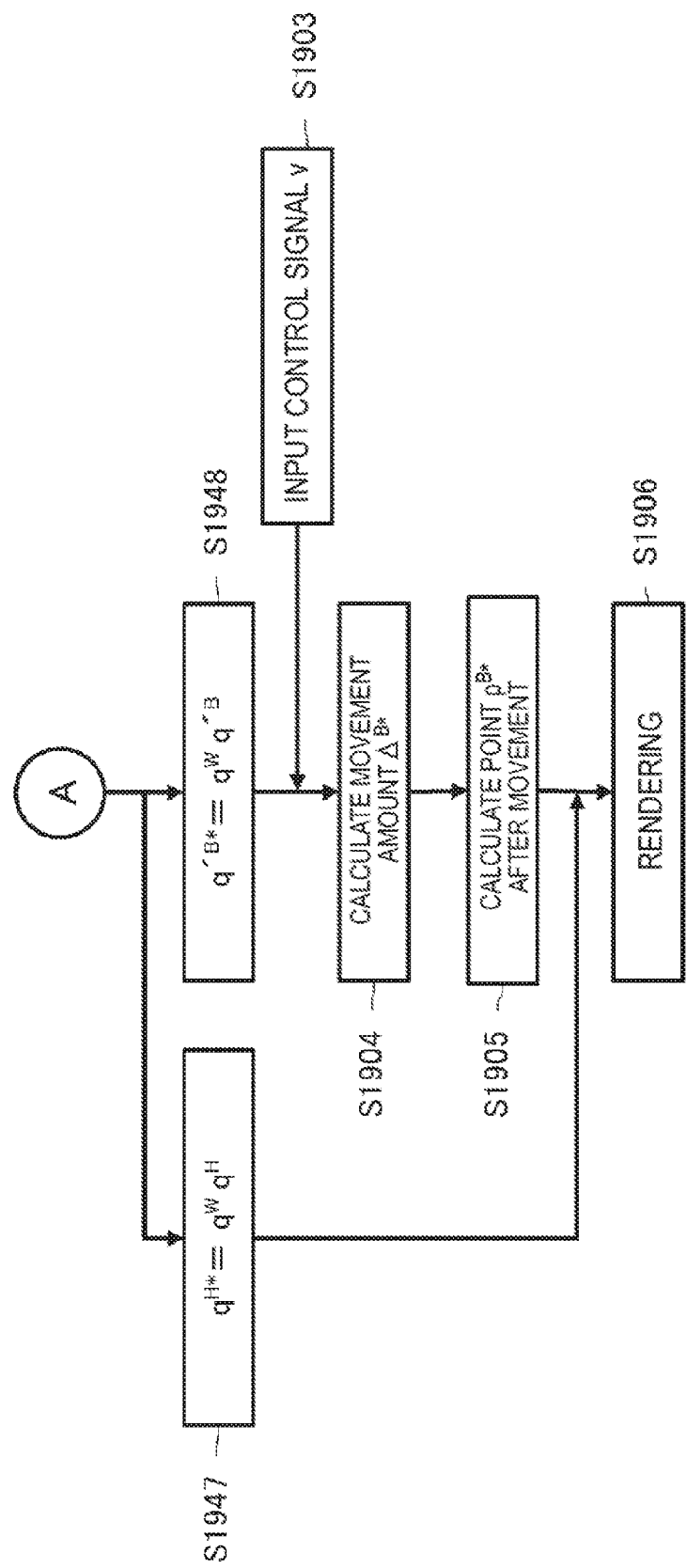
FIG. 20 is a flowchart illustrating an image rendering process procedure for a free viewpoint image, which includes a process of reducing or avoiding an unnatural viewing posture of a user using a second method.

FIG. 19 and FIG. 20 illustrate, by a flowchart, a processing procedure for rendering a free viewpoint image, which includes a process of reducing or avoiding an unnatural viewing posture of the user using the first method. This process is performed by correcting the world coordinate system of the free viewpoint space. Although not shown in FIG. 19 and FIG. 20, the initial value of quaternion $q^W$ indicating the correction to the world coordinate system is set to a unit quaternion.

In the head motion tracking device 200, the sensor unit 201 detects a posture of the user's head (step S1901), and the posture angle operation unit 202 performs an operation on a quaternion $q^H$ that indicates the posture of the user's head based on the detection result (step S1902) and transmits it to the image rendering device 400 through the transmitter 203.

In the trunk motion tracking device 300, the sensor unit 301 detects a trunk posture of the user (step S1911). The posture angle operation unit 202 performs an operation on a quaternion $q^B$ that indicates the posture of the user's trunk based on the detection result (step S1912) and transmits it to the image rendering device 400 through the transmitter 303.

The image rendering device 400 receives the quaternion $q^H$ indicating the head posture from the head motion tracking device 200 and receives the quaternion $q^B$ indicating the trunk posture from the trunk motion tracking device 300. Then, a calibration quaternion q is obtained as the calibration parameter (step S1921). Then, the quaternion $q^B$ indicating the trunk posture is corrected using the calibration parameter q, and the corrected quaternion $q'^B$ of the trunk posture is obtained (step S1913).

The calibration quaternion q is a parameter used to mutually convert a coordinate system in which the head motion tracking device 200 detects the user's head posture and a coordinate system in which the trunk motion tracking device 300 detects the user's trunk posture (as described above). A method of acquiring the calibration quaternion q is optional. In step S1913, the quaternion $q^B$ indicating the trunk posture is corrected by multiplying the calibration quaternion q from the left in accordance with the above formula (6).

Then, it is determined whether the image display system 100 is in the biosafety support mode (step S1941). The determination of whether the biosafety support mode is set may be performed automatically by judging whether the difference ψ between the head and trunk postures that is calculated in accordance with the above formula (14) exceeds a predetermined threshold, as one example. Alternatively, this determination may be performed by the user actively (or, by manually such as pressing a button) judging whether the cancellation of the head tracking is instructed.

If the biosafety support mode is set (Yes in step S1941), it is further checked whether the current time is a moment at which the biosafety support mode is set (step S1942), then the user's head posture $q^H$ at a moment where the mode is set is saved as a $q^{H0}$ (step S1943).

Then, the head posture in the free viewpoint space is fixed by replacing a quaternion $q^H$ of the head posture that is newly detected and calculated with the $q^{H0}$ during the period of the biosafety support mode, thereby preventing the head tracking to be performed upon rendering. The trunk posture $q'^B$ in the free viewpoint space may be changed by the amount of change in the head posture $q^H$ detected by the head motion tracking device 200 by replacing the $q'^B$ of the trunk posture that is corrected in step S1913 in accordance with the following formula (19) (step S1944). More specifically, the change in the head postures is compensated using the trunk posture, by multiplying the trunk posture $q'^B$ by the inverse of the quaternion $q^H$ of the current head posture and the quaternion $q^{H0}$ of the head posture at a moment where the head tracking is cancelled, in this order, from the left.

[Math. 19]

$$\left.\begin{array}{l}q^H = q^{H0}\\q'^B = q^{H0}q^{H-1}q'^B\end{array}\right\} \tag{19}$$

On the other hand, if the biosafety support mode is not set (No in step S1941), it is determined whether this time is a moment where the biosafety support mode is released (step S1945). Then, if this time is a moment where the biosafety support mode is released (Yes in step S1945), the quaternion $q^W$ that is used to correct the world coordinate system is updated using the following formula (20) to compensate the change in the head postures in the reality during the period of the biosafety support mode (step S1946). More specifically, the change in the head postures is compensated using the trunk posture, by multiplying the quaternion $q^W$ by the inverse of the quaternion $q^H$ of the current head posture and the quaternion $q^{H0}$ of the head posture at a moment where the head tracking is cancelled, in this order, from the left.

[Math. 20]

$$q^W=q^W q^{H0} q^{H-1} \tag{20}$$

Then, the correction of each of the head posture $q^{H*}$ and the trunk posture $q'^{B*}$ in the free viewpoint space is performed by multiplying each of the quaternion $q^H$ of the head posture and the quaternion $q'^B$ of the trunk posture by the quaternion $q^W$ from the left (steps S1947 and S1948), and the manipulation to bring the head posture to be close to the trunk posture is performed by rotating the world coordinate system gradually.

The image rendering device 400 receives a control signal v, such as velocity and amount of displacement, used to move in the free viewpoint space as an input (step S1903). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

Then, in the image rendering processing unit 402, the movement amount $\Delta^B*$ corresponding to the inputted control signal v is calculated using the above formula (18), based on the trunk posture $q'^B*$ in the free viewpoint space that is obtained by correcting the world coordinate system by the quaternion $q^W$ (step S1904).

Then, the image rendering processing unit 402 calculates a point $p^B*$ obtained by moving the current point by the movement amount $\Delta^B*$ in the direction of the user's trunk posture $q^B$ (the front direction of the trunk) in the free viewpoint space (step S1905). The point $p^B*$ associated with the corrected user's trunk posture information $q^B*$ is set to a viewpoint position in the free viewpoint space, an image $I^B*$ viewed in the line-of-sight direction represented as the corrected quaternion $q^H*$ of the head posture is rendered from the viewpoint position $p^B*$ (step S1906), and then the rendered image is displayed on the display device 500 as an output. The free viewpoint image $I^B*$ generated in this procedure is generated based on a function f for generating an image being viewed from the viewpoint position $p^B*$ and the line-of-sight direction $q^H*$ (same as the above).

Also in the processing procedure shown in FIG. 19 and FIG. 20, the image rendering may be performed by considering the delay time that occurs during the time from the detection of the user's head and trunk postures to the display of the image (same as the above).

In this way, in the image display system 100 according to the present embodiment, the user's trunk posture information $q^B$ that is obtained by the trunk motion tracking device 300 can be used in addition to the user's head posture information $q^H$ that is obtained by the head motion tracking device 200. Thus, it is possible to reduce or avoid an unnatural viewing posture of the head due to the free viewpoint viewing.

E. Display of Meta-Information of Free Viewpoint Image

An example of the free viewpoint image content can include an image captured by a wide-angle camera mounted in a mobile device such as automobile and radio control and a game image of the first-person viewpoint, in addition to the existing TV broadcasting.

The user sometimes wants to refer to meta-information relating to the free viewpoint image content that is being viewed. An example of the meta-information referred herein can include information relating to content playback position or remaining playback time, information relating to coordinates or a map indicating its own current position in a virtual space, and a state of a character manipulated in a game (e.g. in a battle game, the degree of fatigue or injury, the remaining number of weapons or ammunition, spoils taken until now, a score, or the like).

The field of view of the user who is viewing the free viewpoint image is blocked from the outside world or the user is immersed in the virtual world. Thus, the user sometimes wants to refer to real-world information rather than the meta-information as described above. An example of the real-world information can include the current time or other environment information, email or phone call notification, or the like.

It is possible for the user to check desired meta-information or real-world information without interrupting the viewing of the free viewpoint image by displaying a user interface component with such content meta-information or real-world information described thereon in the free viewpoint image.

When such UI widget is arranged by considering only the user's head posture, that is, when the UI widget is arranged in a fixed position that is oriented based on the head posture, the free viewpoint image tracks the user's head posture, that is, the line-of-sight direction, and the UI widget continues to be displayed in the same place.

When the UI widget is displayed in the same place all the time, it is possible for the user to check meta-information or real-world information at any time during viewing. The free viewpoint image varies with the movement of the head posture, but the arrangement of the UI widget in the same place all the time is unnatural, which leads to a significant impairment of a sense of realism or immersion. The information relating to the free viewpoint image will be typically located in the place where the UI widget is arranged, which causes the user to feel the difficulty in viewing or playing a game. Sometimes, there is the time zone in which the user does not want to view the meta-information or real-world information, and the user may feel the burdensomeness from a display of the UI widget.

Figure 25:
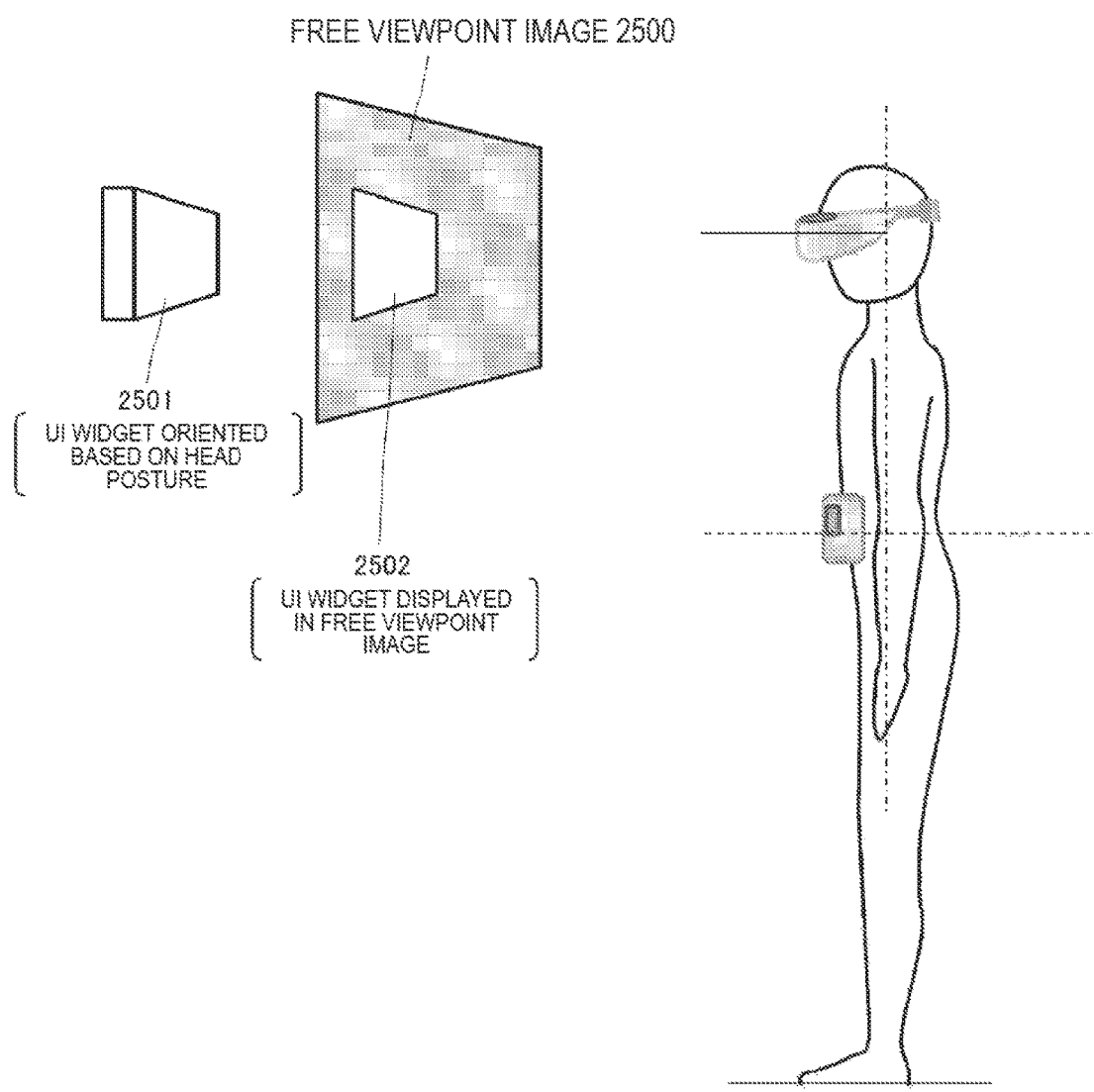
FIG. 25 is a diagram illustrating a processing procedure for rendering a free viewpoint image when a UI widget is arranged in a fixed position oriented based on the user's head posture.
Figure 26:
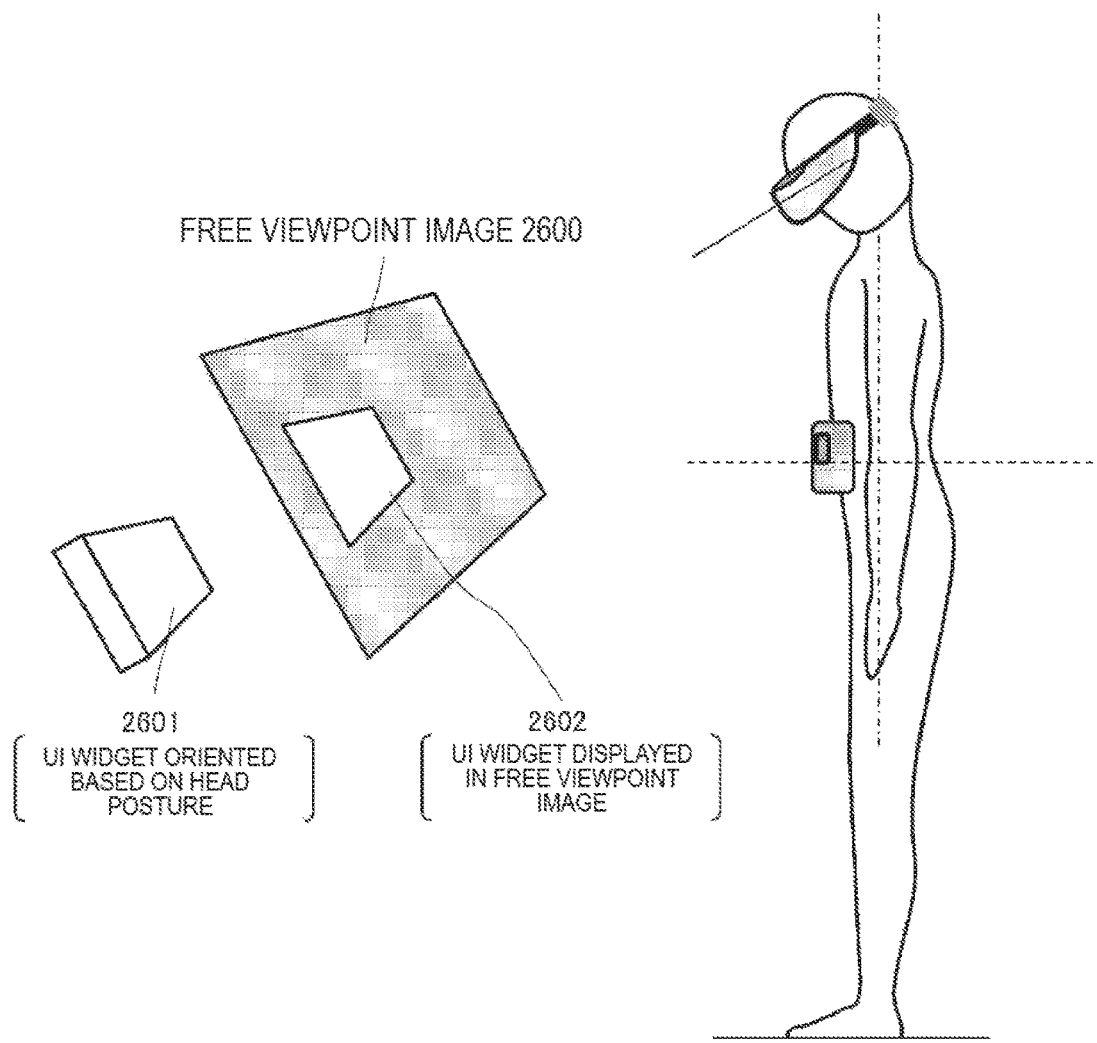
FIG. 26 is a diagram illustrating a processing procedure for rendering a free viewpoint image when a UI widget is arranged in a fixed position oriented based on the user's head posture.

FIGS. 25 and 26 illustrate a display example of the free viewpoint image when a UI widget is arranged in a fixed position that is oriented based on the user's head posture obtained from the head motion tracking device 200.

In the example illustrated in FIG. 25, the user's head faces forward, and the UI widget is arranged in the front direction of the user's head as denoted by reference numeral 2501. Thus, in this case, the UI widget is projected onto a free viewpoint image 2500 as denoted by reference numeral 2502.

In the example illustrated in FIG. 26, the user bows with his head directing downward. In this case, the UI widget is arranged in the front direction of the user's head, as denoted by reference numeral 2601. Thus, also in this case, the UI widget is projected onto a free viewpoint image 2600, as denoted by reference numeral 2602. In other words, the UI widget is present in the free viewpoint image at all time, regardless of the user's head posture.

Figure 27:
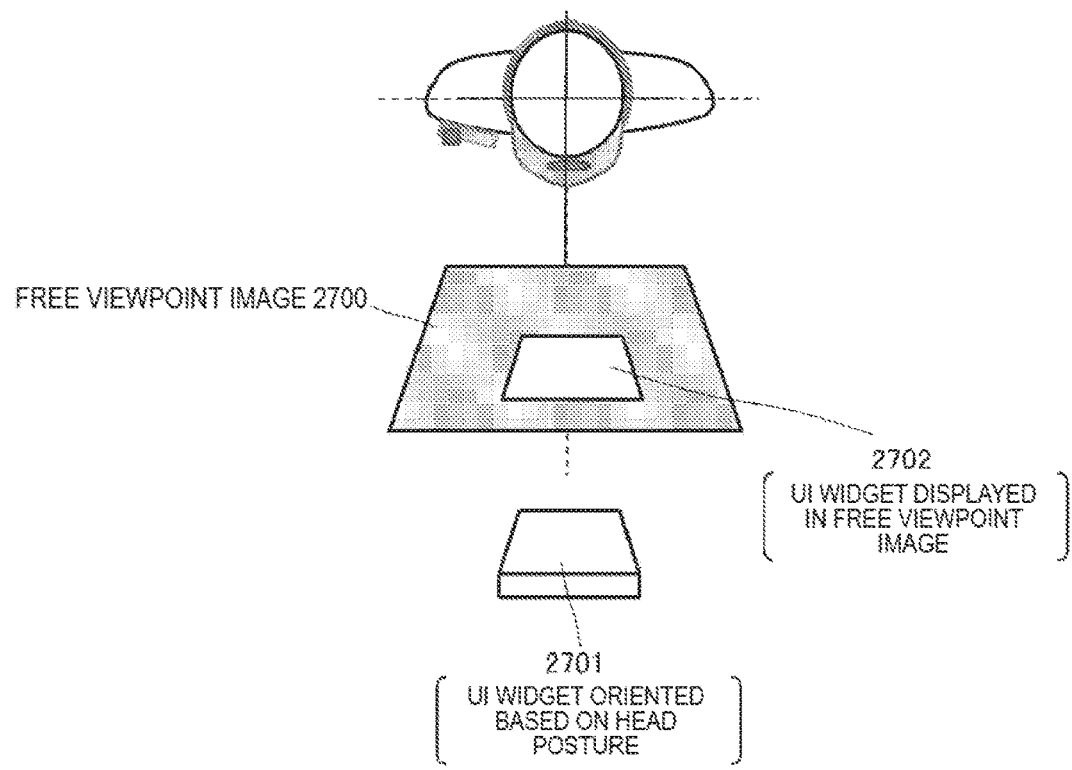
FIG. 27 is a diagram illustrating a processing procedure for rendering a free viewpoint image when a UI widget is arranged in a fixed position oriented based on the user's head posture.
Figure 28:
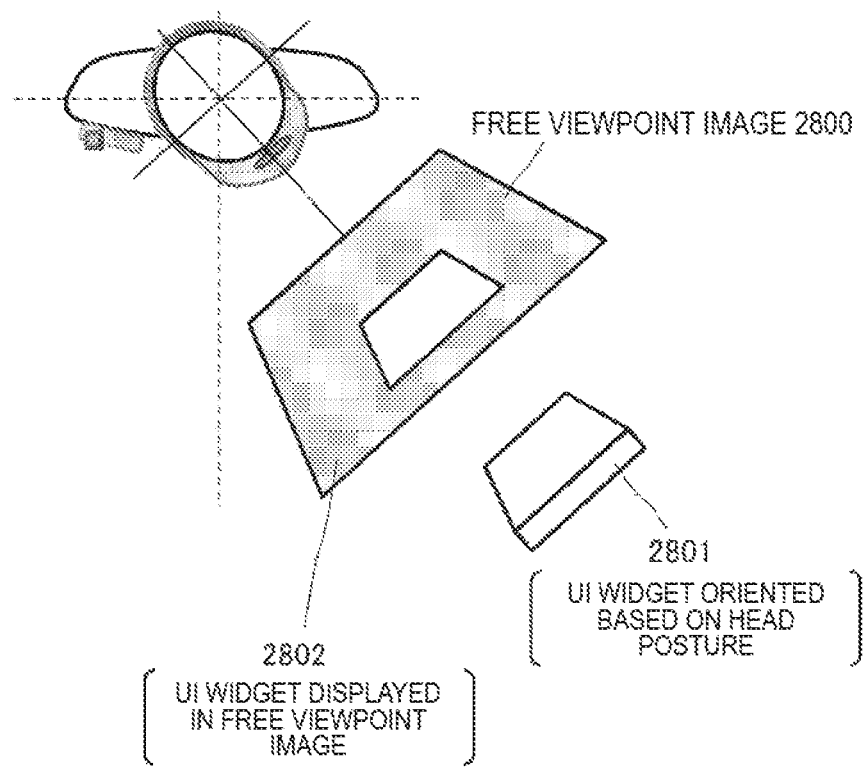
FIG. 28 is a diagram illustrating a processing procedure for rendering a free viewpoint image when a UI widget is arranged in a fixed position oriented based on the user's head posture.

FIGS. 27 and 28 illustrate another display example of the free viewpoint image when a UI widget is arranged in a fixed position that is oriented based on the user's head posture obtained from the head motion tracking device 200.

In the example illustrated in FIG. 27, the user's head faces forward, and the UI widget is arranged in the front direction of the user's head as denoted by reference numeral 2701. Thus, in this case, the UI widget is projected onto a free viewpoint image 2700 as denoted by reference numeral 2702.

In the example illustrated in FIG. 28, the user turns around to the left and the head is directed to the left. In this case, the UI widget is arranged in the front direction of the user's head as denoted by reference numeral 2801. Thus, in this case, a UI widget is projected onto a free viewpoint image 2800 as denoted by reference numeral 2802. In other words, the UI widget is present in the free viewpoint image at all time, regardless of the user's head posture.

Figure 29:
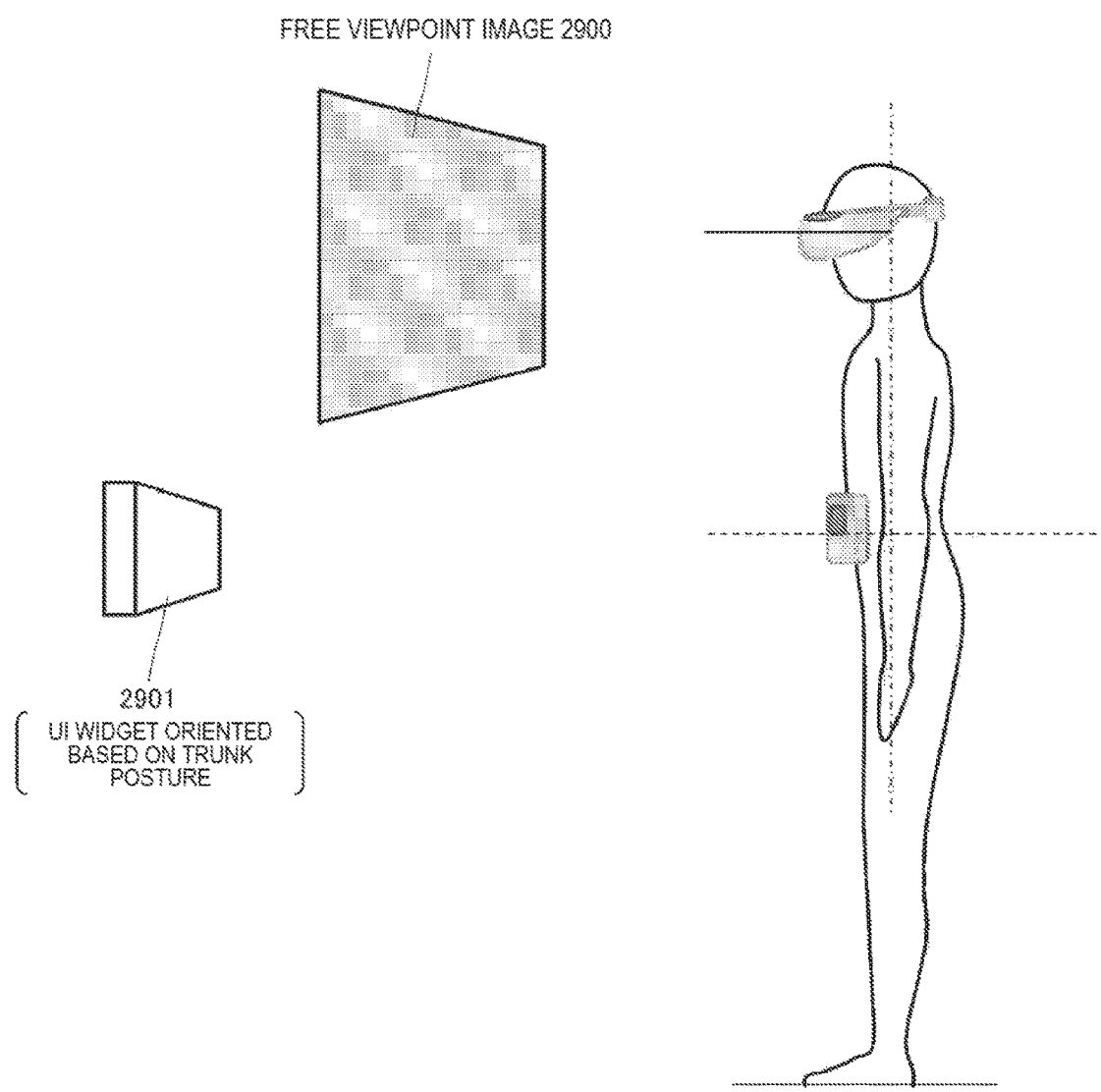
FIG. 29 is a diagram illustrating a display example of a free viewpoint image when a UI widget is arranged in a fixed position oriented based on a user's trunk posture.
Figure 30:
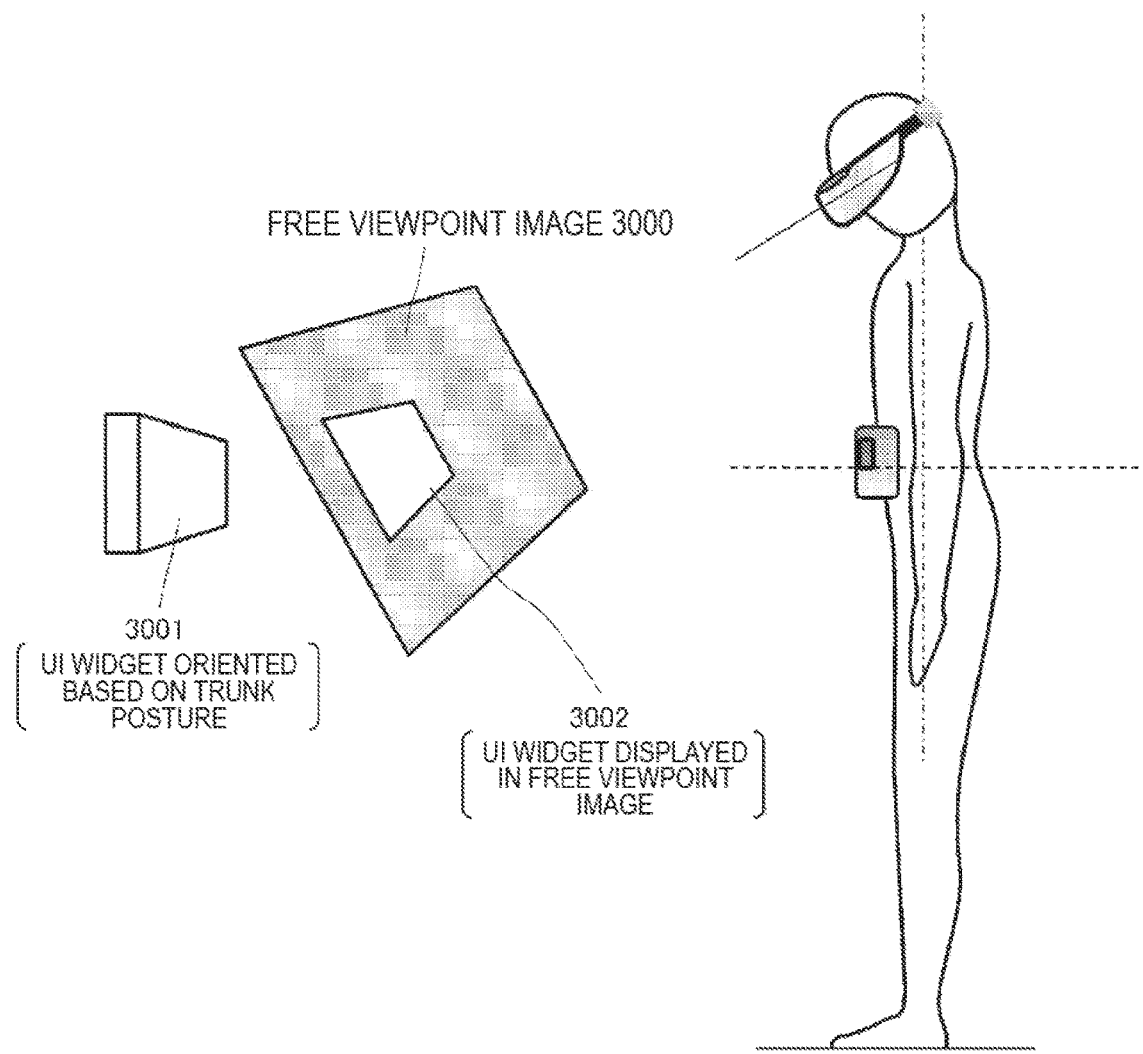
FIG. 30 is a diagram illustrating a display example of a free viewpoint image when a UI widget is arranged in a fixed position oriented based on a user's trunk posture.

On the other hand, FIGS. 29 and 30 illustrate a display example of the free viewpoint image when a UI widget is arranged in a fixed position that is oriented based on the user's trunk posture obtained from the trunk motion tracking device 300.

In the example illustrated in FIG. 29, the user's head faces forward, but the UI widget is arranged in the front direction of the user's trunk as denoted by reference numeral 2901. Thus, in this case, there is no UI widget in a free viewpoint image 2600.

In the example illustrated in FIG. 30, the user bows with his head turned down. In this case, a UI widget is arranged in the front direction of the user's trunk, as denoted by reference numeral 3001. Thus, the turning of the user's head down allows the UI widget to be displayed on a free viewpoint image 3000 as shown by reference numeral 3002.

In other words, although the UI widget is hidden in a normal posture in which the user turns his head forward, it is possible to cause the UI widget to be displayed in the free viewpoint image by turning the head down. A three-dimensional UI widget may be arranged in the free viewpoint image by correcting the posture of the UI widget oriented at a fixed position based on the user's trunk posture to face the front according to the user's head posture.

Figure 31:
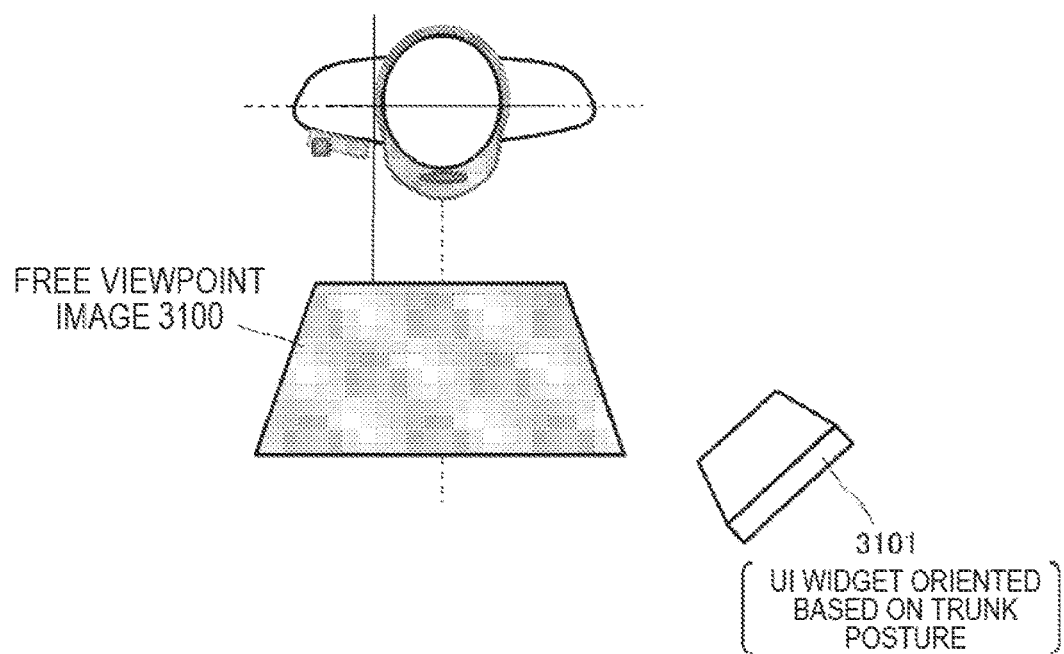
FIG. 31 is a diagram illustrating a display example of a free viewpoint image when a UI widget is arranged in a fixed position oriented based on a user's trunk posture.
Figure 32:
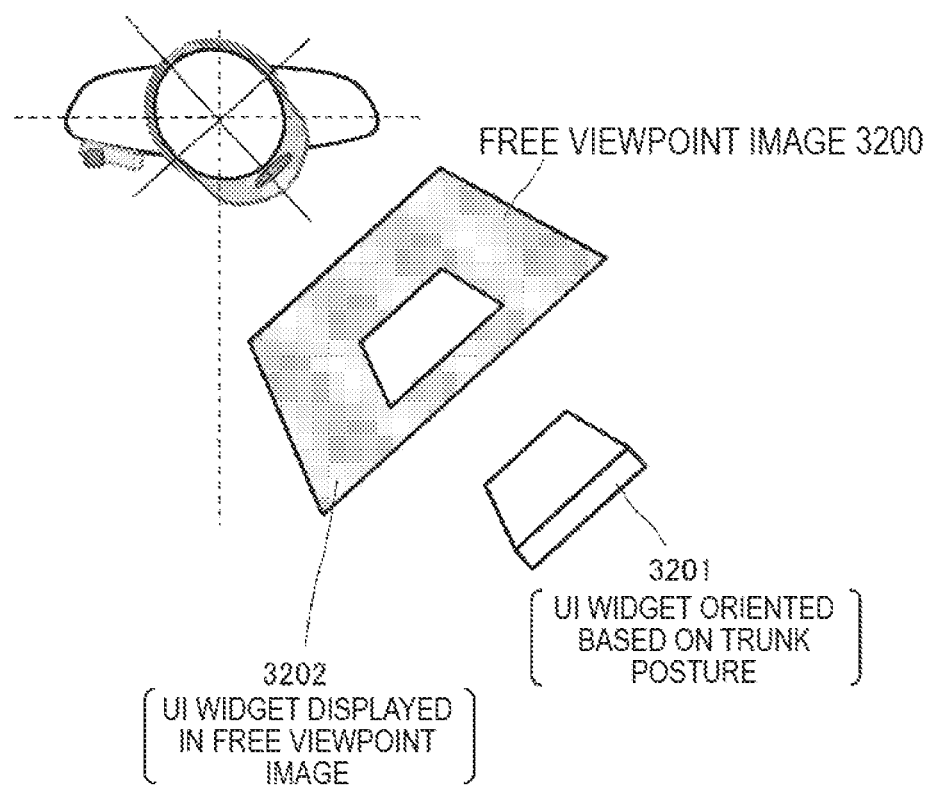
FIG. 32 is a diagram illustrating a display example of a free viewpoint image when a UI widget is arranged in a fixed position oriented based on a user's trunk posture.

On the other hand, FIGS. 31 and 32 illustrate another display example of the free viewpoint image when a UI widget is arranged in a fixed position that is oriented based on the user's trunk posture obtained from the trunk motion tracking device 300.

In the example illustrated in FIG. 31, the user's head faces forward, but the UI widget is arranged in the left direction of the user's trunk as denoted by reference numeral 3101. Thus, in this case, there is no UI widget in a free viewpoint image 3100.

In the example illustrated in FIG. 32, the user turns around to the left and the head is directed to the left. In this case, the UI widget is arranged in the left direction of the user's trunk as denoted by reference numeral 3201. Thus, the turning of the user's head to the left allows the UI widget to be displayed on a free viewpoint image 3200 as shown by reference numeral 3202.

In other words, although the UI widget is hidden in a normal posture in which the user turns his head forward, it is possible to cause the UI widget to be displayed in the free viewpoint image by turning the head to the left. A three-dimensional UI widget may be arranged in the free viewpoint image by correcting the posture of the UI widget oriented at a fixed position based on the user's trunk posture to face the front according to the user's head posture.

Figure 23:
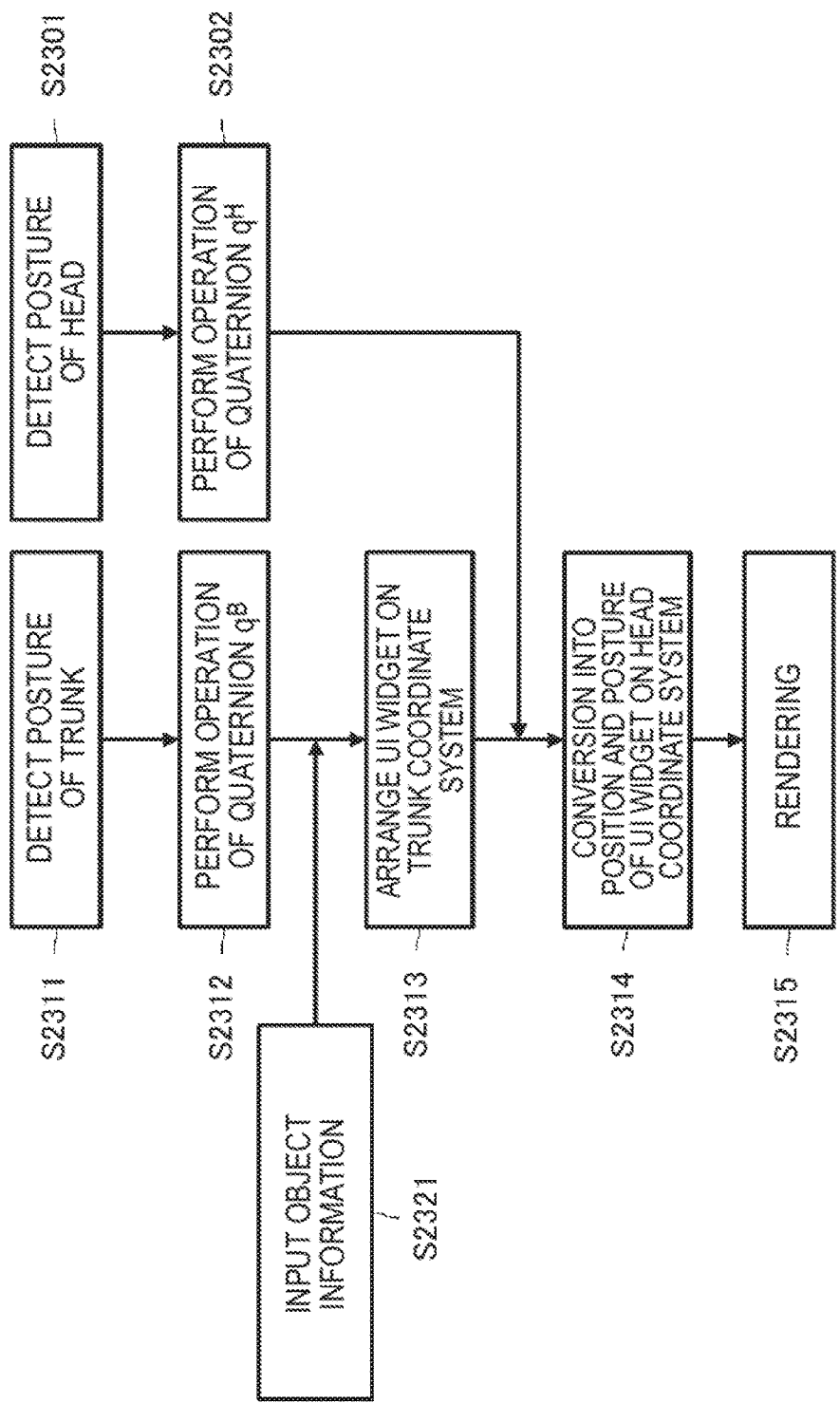
FIG. 23 is a flowchart illustrating a processing procedure for rendering a free viewpoint image by arranging a UI widget in a fixed position oriented based on the user's trunk posture.

FIG. 23 illustrates, by a flowchart, the procedure of an image rendering process of the free viewpoint image in which a UI widget is arranged in a fixed position oriented based on the user's trunk posture.

In the head motion tracking device 200, the sensor unit 201 detects a posture of the user's head (step S2301), and the posture angle operation unit 202 performs an operation on a quaternion $q^H$ that indicates the posture of the user's head based on the detection result (step S2302) and transmits it to the image rendering device 400 through the transmitter 203.

In the trunk motion tracking device 300, the sensor unit 301 detects a trunk posture of the user (step S2311). The posture angle operation unit 202 performs an operation on a quaternion $q^B$ that indicates the posture of the user's trunk based on the detection result (step S2312) and transmits it to the image rendering device 400 through the transmitter 303.

Then, if the image rendering device 400 receives the content meta-information or real-world information described above as an input (step S2321), a UI widget indicating the inputted information is arranged in a fixed position oriented on the user trunk coordinate system based on the quaternion $q^B$ indicating the user's trunk posture (step S2313). Then, the image rendering processing unit 402 converts the position and posture of the UI widget arranged on the user trunk coordinate system into the position and posture on the head coordinate system based on the quaternion $q^H$ indicating the user's head posture (step S2314).

When a position of i-th UI widget in the user trunk coordinate system is set to $p_i$ and a posture thereof is set to $q_i$, it is possible to convert the position and posture into a position $p'_i$ and a posture $q'_i$ in the user head coordinate system, in accordance with the following formulas (21) and (22).

[Math. 21]
$$p'_i = p_i + p^{BH} \qquad (21)$$

[Math. 22]
$$q'_i = q^B q^{H-1} q_i \qquad (22)$$

In the above formula (21), $p^{BH}$ is the origin position of the user trunk coordinate system as viewed from the origin of the user head coordinate system. If position information of the head or the trunk (along with the posture information) can be acquired, an actually measured value may be used for $p^{BH}$. As one example, by using an average value of the Japanese adult male, $p^{BH}$ may be parameterized such as $p^{BH} = (0\ m,\ 0\ m,\ -0.75\ m)$ or the like.

In the above formula (22), $q^B q^{H-1}$ in the right side is obtained by multiplying the quaternion $q^B$ indicating the user's trunk posture by the inverse of the quaternion $q^H$ indicating the head posture from the right, and is a quaternion used to convert the posture of an object (UI widget) in the trunk coordinate system into the posture in the head coordinate system.

Then, the image rendering processing unit 402 renders an image in which the free viewpoint in which the UI widget is arranged is viewed in the line-of-sight direction represented by the quaternion $q^H$ (step S2315), and then the rendered image is displayed on the display device 500 as an output.

Also in the processing procedure shown in FIG. 23, the image rendering may be performed by considering the delay time that occurs during the time from the detection of the user's head and trunk postures to the display of the image (same as the above).

Although not illustrated in the flowchart shown in FIG. 23, by employing the calibration process described in the above item C, the association between the coordinate system of the user's head posture detected by the head motion tracking device 200 and the coordinate system of the user's trunk posture detected by the trunk motion tracking device 300 may be performed.

Figure 24:
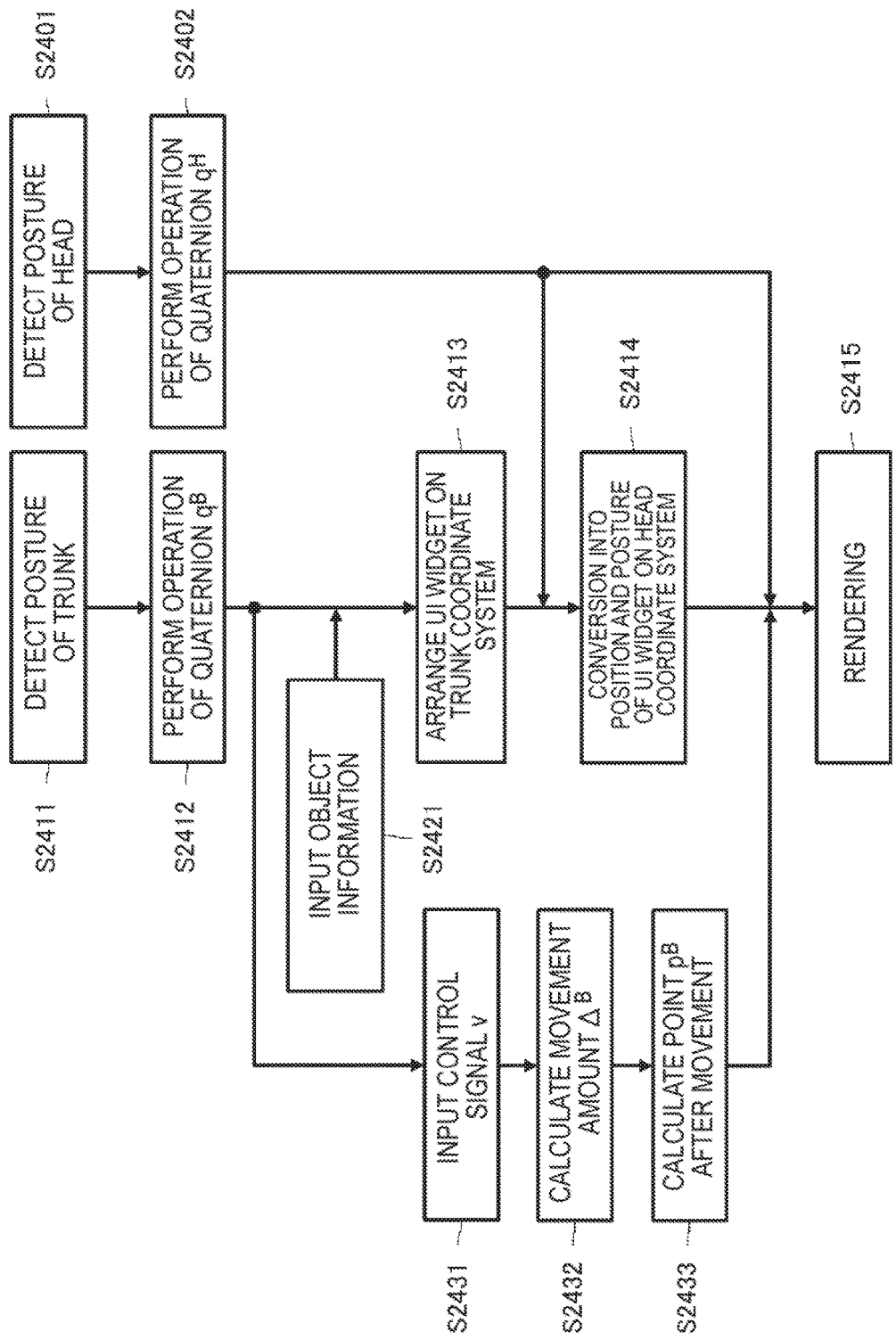
FIG. 24 is a flowchart illustrating a processing procedure for rendering a free viewpoint image by arranging a UI widget in a fixed position oriented based on the user's trunk posture.

FIG. 24 illustrates, by a flowchart, another example of a processing procedure for rendering a free viewpoint image in which a UI widget is arranged in a fixed position oriented based on the user's trunk posture. The processing procedure shown in FIG. 24 is different from that shown in FIG. 23 in that the viewpoint position of the user in the free viewpoint is controlled, based on a trunk posture of the user.

In the head motion tracking device 200, the sensor unit 201 detects a posture of the user's head (step S2401), and the posture angle operation unit 202 performs an operation on a quaternion $q^H$ that indicates the posture of the user's head based on the detection result (step S2402) and transmits it to the image rendering device 400 through the transmitter 203.

In the trunk motion tracking device 300, the sensor unit 301 detects a trunk posture of the user (step S2411). The posture angle operation unit 202 performs an operation on a quaternion $q^B$ that indicates the posture of the user's trunk based on the detection result (step S2412) and transmits it to the image rendering device 400 through the transmitter 303.

Then, if the image rendering device 400 receives the content meta-information or real-world information described above as an input (step S2421), a UI widget indicating the inputted information is arranged in a fixed position oriented on the user trunk coordinate system based on the quaternion $q^B$ indicating the user's trunk posture (step S2413). Then, the image rendering processing unit 402 converts the position and posture of the UI widget arranged on the user trunk coordinate system into the position and posture on the head coordinate system based on the quaternion $q^H$ indicating the user's head posture in accordance with the above formulas (21) and (22) (step S2414).

The image rendering device 400 receives a control signal v, such as velocity and amount of displacement, used to move in the free viewpoint space as an input (step S2431). As one example, the image rendering device 400, when generating a three-dimensional image such as a game, receives the control signal v corresponding to a manipulated variable of the joystick or the like of a game controller as an input. The control signal v may be received as an input by causing a smartphone to display a manipulation screen to be manipulated by the user. Alternatively, the movement of the physical position of the user's head detected using a camera or the like installed outside may be inputted as the control signal v.

The image rendering processing unit 402 calculates a movement amount $\Delta^B$ in the free viewpoint space depending on the inputted control signal v (step S2432). In this process routine, the posture information of the user's trunk that can be obtained from the trunk motion tracking device 300 is used, and thus the control signal v can be associated with the posture information $q^B$ of the user's trunk, and the movement amount $\Delta^B$ is determined as shown in the above formula (4).

Then, the image rendering processing unit 402 calculates a point $p^B$ obtained by moving the current point by the movement amount $\Delta^B$ in the direction of the user's trunk posture $q^B$ (the front direction of the trunk) in the free viewpoint space (step S2433).

The point $p^B$ associated with the user's trunk posture information $q^B$ is set to a viewpoint position in the free viewpoint space, an image viewed in the line-of-sight direction represented as the quaternion $q^H$ of the head posture is rendered from the viewpoint position $p^B$ (step S2415), and then the rendered image is displayed on the display device 500 as an output.

Also in the processing procedure shown in FIG. 24, the image rendering may be performed by considering the delay time that occurs during the time from the detection of the user's head and trunk postures to the display of the image (same as the above).

Although not illustrated in the flowchart shown in FIG. 24, by employing the calibration process described in the above item C, the association between the coordinate system of the user's head posture detected by the head motion tracking device 200 and the coordinate system of the user's trunk posture detected by the trunk motion tracking device 300 may be performed.

CITATION LIST

Patent Literature

Patent Literature 1: JP 2012-141461A
Patent Literature 2: JP H9-106322A
Patent Literature 3: JP 2010-256534A

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

Although the embodiment for implementing the free viewpoint viewing and viewpoint-moving environment with a head-mounted display has been mainly described herein, the technology described herein is applicable to other use cases. As one example, the user who plays a game while sitting in front of a large screen display such as television or projector can wear the head motion tracking device 200 and the trunk motion tracking device 300, thereby implementing the free viewpoint viewing and viewpoint-moving environment in a game screen of the television.

The technology described herein is applicable to any type of immersive, see-through, and video see-through head-mounted displays. The technology described herein is applicable to any type of binocular and monocular head-mounted displays.

Essentially, the technology disclosed in this specification has been described by way of example, and the stated content of this specification should not be interpreted as being limiting. The spirit of the technology disclosed in this specification should be determined in consideration of the claims.

Additionally, the present technology may also be configured as below.

(1)
An information processing apparatus including:
a receiver configured to receive first information on a posture of a head of an observer and second information on a posture of a body other than the head of the observer; and
an image rendering processing unit configured to generate a display image corresponding to a posture of the observer based on the first information and the second information.

(2)
The information processing apparatus according to (1),
wherein the receiver receives at least a posture of a trunk of the observer as the second information, and
the image rendering processing unit generates a free viewpoint image that tracks a posture of the head of the observer by orienting a line-of-sight direction of the observer in a free viewpoint space based on the first information and by orienting an orientation (viewpoint position) of the body of the observer in the free viewpoint space based on a posture of the trunk of the observer obtained from the second information.

(3)
The information processing apparatus according to (2),
wherein the image rendering processing unit, when receiving a control signal used to instruct the observer to move in the free viewpoint space as an input, determines a point after movement (viewpoint position) by recognizing, as a front direction, an orientation of a body oriented based on a posture of the trunk of the observer obtained from the second information.

(4)

The information processing apparatus according to (1), wherein the image rendering processing unit generates a free viewpoint image that tracks a posture of the head of the observer by orienting a line-of-sight direction of the observer in a free viewpoint space based on the first information and by arranging in a fixed position oriented based on the posture obtained from the second information.

(5)

The information processing apparatus according to (1), wherein the receiver receives at least a posture of the trunk of the observer as the second information, and the image rendering processing unit generates a free viewpoint image that tracks a posture of the head of the observer by orienting a line-of-sight direction of the observer in a free viewpoint space based on the first information, by orienting an orientation (viewpoint position) of the body of the observer in the free viewpoint space based on a posture of the trunk of the observer obtained from the second information, and by arranging a predetermined image widget in a fixed position oriented based on a posture of the trunk of the observer.

(5-1)

The information processing apparatus according to any one of (4) and (5), wherein the image rendering processing unit arranges the image widget including meta-information relating to the free viewpoint image.

(6)

The information processing apparatus according to any one of (1) to (5), further including:

a calibration processing unit configured to acquire a calibration parameter, wherein the image rendering processing unit performs image generation using posture information corrected by the calibration parameter.

(7)

The information processing apparatus according to (6), wherein the calibration processing unit, based on head posture information obtained from the first information and second posture information obtained from the second information, calculates a calibration parameter used to correct the second posture information and corrects the second posture information using the calibration parameter.

(8)

The information processing apparatus according to (7), wherein the calibration processing unit calculates a posture conversion parameter used to match the second posture information with the head posture information as the calibration parameter, by using the head posture information and the second posture information.

(9)

The information processing apparatus according to (7), wherein the posture information is represented by a quaternion, the calibration processing unit calculates a calibration quaternion used to correct the second posture information by multiplying the head posture information by an inverse of a quaternion of the second posture information from a right side, and the correction is performed by multiplying the quaternion of the second posture information by the calibration quaternion from a left side.

(10)

The information processing apparatus according to (6), wherein the calibration processing unit estimates a calibration parameter used to correct the second posture information based on rotational displacement for a certain period of a coordinate system of a head posture obtained from the first information and a coordinate system of a posture obtained from the second information and a property of a human body.

(11)

The information processing apparatus according to (6), wherein the calibration processing unit sets a time-series average of calibration parameters calculated for a certain period based on head posture information obtained from the first information and second posture information obtained from the second information to be a final calibration parameter.

(12)

The information processing apparatus according to (11), wherein the posture information is represented by a quaternion, and the calibration processing unit updates a calibration quaternion by performing spherical linear interpolation between a calibration quaternion newly calculated based on a quaternion of posture information obtained from each of the first information and the second information that have been newly received and a last calibration quaternion determined by the time-series average.

(12-1)

The image display device according to (11), wherein the calibration processing unit maps a time series of a calibration quaternion onto a three-dimensional space by logarithmic conversion, calculates a representative value including an arithmetic mean, and then returns a resultant value to the quaternion by exponential conversion.

(13)

The information processing apparatus according to (11), wherein a posture of the trunk of the observer is calculated based on the second information, and the calibration processing unit determines an average value of an angular difference of a rotation direction, when a gravity direction is set to a rotation axis, of posture information of a head and a trunk obtained respectively from the first information and the second information that have been newly received, and calculates a calibration parameter on a gravity direction and the average value.

(14)

The information processing apparatus according to (1), wherein the image rendering processing unit processes a display image on the display unit based on a difference between a head posture obtained from the first information and a trunk posture obtained from the second information.

(15)

The information processing apparatus according to any one of (2) and (3), wherein the image rendering processing unit generates a free viewpoint image by correcting a world coordinate system in a manner that a difference between a head posture and a trunk posture in the free viewpoint space decreases under a biosafety support mode.

(16)

The information processing apparatus according to any one of (2) and (3), wherein the image rendering processing unit generates a free viewpoint image by fixing a head posture in a free viewpoint space at a point of time when a biosafety support mode is set and by changing a trunk posture in a free viewpoint space depending on a head posture detected by the head posture detection unit under the biosafety support mode.

(17)

The information processing apparatus according to any one of (15) and (16), wherein the biosafety support mode is set when a state where a difference between a head posture obtained from the first information and a trunk posture obtained from the second information exceeds a first threshold continues for a certain time, and the biosafety support mode is released when the difference is equal to or less than a second threshold that is less than the first threshold.

(18)

An information processing method including:

a receiving step of receiving first information on a posture of a head of an observer and second information on a posture of a body other than the head of the observer; and; and an image rendering processing step of generating a display image corresponding to a posture of the observer based on the first information and the second information.

(19)

A computer program written in a computer readable format to cause a computer to function as:

a head posture operation unit configured to calculate posture information of a head of an observer based on a result obtained by detection in a head posture detection unit configured to detect a posture of the head of the observer;

a second posture operation unit configured to calculate posture information of a second part of a body other than the head of the observer based on a result obtained by detection in a second posture detection unit configured to detect a posture of one or more of the second part; and an image rendering processing unit configured to process an image to be displayed on a display unit based on a posture of the head of the observer and a posture of the second part, the display unit being fixed to the head or a face of the observer.

(20)

An image processing system including:

a display unit fixed to a head or a face of an observer;

a head posture detection unit configured to detect a posture of the head of the observer;

a second posture detection unit configured to detect a posture of one or more second parts of a body other than the head of the observer; and an image rendering processing unit configured to process a display image on the display unit based on a posture of the head of the observer and a posture of each of the second parts.

REFERENCE SIGNS LIST 100 image display system
200 head motion tracking device
201 sensor unit
202 posture angle operation unit
203 transmitter
300 trunk motion tracking device
301 sensor unit
302 posture angle operation unit
303 transmitter
400 image rendering device
401 receiver
402 image rendering processing unit
403 transmitter
404 image source
500 display device
501 receiver
502 display unit

The invention claimed is:

1. An information processing apparatus comprising:
a receiver configured to receive first information on a posture of a head of an observer and second information on a posture of a body other than the head of the observer; and
an image rendering processing unit configured to generate a display image corresponding to a posture of the observer based on the first information and the second information,
wherein the receiver receives at least a posture of a trunk of the observer as the second information, and
the image rendering processing unit is configured to
generate a free viewpoint image that tracks a posture of the head of the observer by orienting a line-of-sight direction of the observer in a free viewpoint space based on the first information and by orienting an orientation (viewpoint position) of the body of the observer in the free viewpoint space based on a posture of the trunk of the observer obtained from the second information, and
when receiving a control signal used to instruct the observer to move in the free viewpoint space as an input, determine a movement amount in a front direction of the trunk of the observer in the free viewpoint space based on the posture of the trunk of the observer indicated in the second information and by recognizing the orientation of the body of the observer as a position of a front of the observer.

2. The information processing apparatus according to claim 1,
wherein the image rendering processing unit generates the free viewpoint image that tracks the posture of the head of the observer by arranging in a fixed position oriented based on the posture obtained from the second information.

3. The information processing apparatus according to claim 1,
wherein
the image rendering processing unit generates the free viewpoint image that tracks the posture of the head of the observer by arranging a predetermined image widget in a fixed position oriented based on the posture of the trunk of the observer.

4. The information processing apparatus according to claim 1, further comprising:
a calibration processing unit configured to acquire a calibration parameter,
wherein the image rendering processing unit performs image generation using posture information corrected by the calibration parameter.

5. An information processing apparatus comprising:
a receiver configured to receive first information on a posture of a head of an observer and second information on a posture of a body other than the head of the observer;
an image rendering processing unit configured to generate a display image corresponding to a posture of the observer based on the first information and the second information; and
a calibration processing unit configured to acquire a calibration parameter for mutually converting a coordinate system in which the posture of the head of the observer is indicated in the first information and a coordinate system in which the posture of the body other than the head of the observer is indicated in the second information, wherein the image rendering processing unit performs image generation using posture information corrected by the calibration parameter, and wherein the calibration processing unit, based on head posture information obtained from the first information and second posture information obtained from the second information, calculates a calibration parameter used to correct the second posture information and corrects the second posture information using the calibration parameter.

6. The information processing apparatus according to claim 5, wherein the calibration processing unit calculates a posture conversion parameter used to match the second posture information with the head posture information as the calibration parameter, by using the head posture information and the second posture information.

7. The information processing apparatus according to claim 5, wherein the posture information is represented by a quaternion, the calibration processing unit calculates a calibration quaternion used to correct the second posture information by multiplying the head posture information by an inverse of a quaternion of the second posture information from a right side, and the correction is performed by multiplying the quaternion of the second posture information by the calibration quaternion from a left side.

8. An information processing apparatus comprising:

a receiver configured to receive first information on a posture of a head of an observer and second information on a posture of a body other than the head of the observer;

an image rendering processing unit configured to generate a display image corresponding to a posture of the observer based on the first information and the second information; and a calibration processing unit configured to acquire a calibration parameter, wherein the image rendering processing unit performs image generation using posture information corrected by the calibration parameter, and wherein the calibration processing unit estimates a calibration parameter used to correct the posture information based on rotational displacement for a certain period of a coordinate system of a head posture obtained from the first information and a coordinate system of a posture obtained from the second information and a property of a human body.

9. An information processing apparatus comprising:

a receiver configured to receive first information on a posture of a head of an observer and second information on a posture of a body other than the head of the observer;

an image rendering processing unit configured to generate a display image corresponding to a posture of the observer based on the first information and the second information; and a calibration processing unit configured to acquire a calibration parameter, wherein the image rendering processing unit performs image generation using posture information corrected by the calibration parameter, and wherein the calibration processing unit sets a time-series average of calibration parameters calculated for a certain period based on head posture information obtained from the first information and second posture information obtained from the second information to be a final calibration parameter.

10. The information processing apparatus according to claim 9, wherein the posture information is represented by a quaternion, and the calibration processing unit updates a calibration quaternion by performing spherical linear interpolation between a calibration quaternion newly calculated based on a quaternion of posture information obtained from each of the first information and the second information that have been newly received and a last calibration quaternion determined by the time-series average.

11. The information processing apparatus according to claim 9, wherein a posture of the trunk of the observer is calculated based on the second information, and the calibration processing unit determines an average value of an angular difference of a rotation direction, when a gravity direction is set to a rotation axis, of posture information of a head and a trunk obtained respectively from the first information and the second information that have been newly received, and calculates a calibration parameter on a gravity direction and the average value.

12. An information processing apparatus according to claim 1, wherein the image rendering processing unit processes a display image on a display unit based on a difference between a head posture obtained from the first information and a trunk posture obtained from the second information.

13. An information processing apparatus comprising:

a receiver configured to receive first information on a posture of a head of an observer and second information on a posture of a body other than the head of the observer;

an image rendering processing unit configured to generate a display image corresponding to a posture of the observer based on the first information and the second information, wherein the receiver receives at least a posture of a trunk of the observer as the second information, wherein the image rendering processing unit generates a free viewpoint image that tracks a posture of the head of the observer by orienting a line-of-sight direction of the observer in a free viewpoint space based on the first information and by orienting an orientation (viewpoint position) of the body of the observer in the free viewpoint space based on a posture of the trunk of the observer obtained from the second information, and wherein the image rendering processing unit generates a free viewpoint image by correcting a world coordinate system in a manner that a difference between a head posture and a trunk posture in the free viewpoint space decreases under a biosafety support mode.

14. An information processing apparatus comprising:

a receiver configured to receive first information on a posture of a head of an observer and second information on a posture of a body other than the head of the observer; and an image rendering processing unit configured to generate a display image corresponding to a posture of the observer based on the first information and the second information, wherein the receiver receives at least a posture of a trunk of the observer as the second information, wherein the image rendering processing unit generates a free viewpoint image that tracks a posture of the head of the observer by orienting a line-of-sight direction of the observer in a free viewpoint space based on the first information and by orienting an orientation (viewpoint position) of the body of the observer in the free viewpoint space based on a posture of the trunk of the observer obtained from the second information, and wherein the image rendering processing unit generates a free viewpoint image by fixing a head posture in a free viewpoint space at a point of time when a biosafety support mode is set and by changing a trunk posture in a free viewpoint space depending on a head posture detected by ahead posture detection unit under the biosafety support mode.

15. The information processing apparatus according to claim 13, wherein the biosafety support mode is set when a state where a difference between a head posture obtained from the first information and a trunk posture obtained from the second information exceeds a first threshold continues for a certain time, and the biosafety support mode is released when the difference is equal to or less than a second threshold that is less than the first threshold.

16. An information processing method comprising:

a receiving step of receiving first information on a posture of a head of an observer and second information on a posture of a body other than the head of the observer; and an image rendering processing step of generating a display image corresponding to a posture of the observer based on the first information and the second information, wherein at least a posture of a trunk of the observer as the second information is received in the receiving step, and wherein, in the image rendering processing step, a free viewpoint image is generated that tracks a posture of the head of the observer by orienting a line-of-sight direction of the observer in a free viewpoint space based on the first information and by orienting an orientation (viewpoint position) of the body of the observer in the free viewpoint space based on a posture of the trunk of the observer obtained from the second information, and when a control signal used is received to instruct the observer to move in the free viewpoint space as an input, a movement amount in a front direction of the trunk of the observer in the free viewpoint space is determined based on the posture of the trunk of the observer indicated in the second information and by recognizing the orientation of the body of the observer as a position of a front of the observer.

17. A non-transitory storage medium configured to store a computer program written in a computer readable format to cause a computer to function as:

a head posture operation unit configured to calculate posture information of a head of an observer based on a result obtained by detection in a head posture detection unit configured to detect a posture of the head of the observer;

a second posture operation unit configured to calculate posture information of a second part of a body other than the head of the observer based on a result obtained by detection in a second posture detection unit configured to detect a posture of one or more of the second part; and an image rendering processing unit configured to process an image to be displayed on a display unit based on a posture of the head of the observer and a posture of the second part, the display unit being fixed to the head or a face of the observer, wherein the detection in the second posture detection unit detects at least a posture of a trunk of the observer as the one or more of the second part, and wherein the image rendering processing unit is configured to generate a free viewpoint image that tracks a posture of the head of the observer by orienting a line-of-sight direction of the observer in a free viewpoint space based on the posture information of the head of the observer calculated in the head posture operation unit and by orienting an orientation (viewpoint position) of the body other than the head of the observer in the free viewpoint space based on a posture of the trunk of the observer obtained from the posture information of the second part of the body other than the head calculated in the second posture operation unit, and when receiving a control signal used to instruct the observer to move in the free viewpoint space as an input, determine a movement amount in a front direction of the trunk of the observer in the free viewpoint space based on the posture of the trunk of the observer indicated in the second information and by recognizing the orientation of the body of the observer as a position of a front of the observer.

18. An image processing system comprising:

a display unit fixed to a head or a face of an observer;

a head posture detection unit configured to detect a posture of the head of the observer;

a second posture detection unit configured to detect a posture of one or more second parts of a body other than the head of the observer; and an image rendering processing unit configured to process a display image on the display unit based on a posture of the head of the observer and a posture of each of the second parts, wherein detection in the second posture detection unit detects at least a posture of a trunk of the observer as the one or more second parts, and wherein the image rendering processing unit is configured to generate a free viewpoint image that tracks a posture of the head of the observer by orienting a line-of-sight direction of the observer in a free viewpoint space based on detection of the posture of the head of the observer by the head posture detection unit and by orienting an orientation (viewpoint position) of the one or more second parts of the body other than the head of the observer in the free viewpoint space based on a posture of the trunk of the observer obtained from the detection in the second posture detection unit, and when receiving a control signal used to instruct the observer to move in the free viewpoint space as an input, determine a movement amount in a front direction of the trunk of the observer in the free viewpoint space based on the posture of the trunk of the observer indicated in the second information and by recognizing the orientation of the body of the observer as a position of a front of the observer.

* * * * *